US007016671B2

(12) United States Patent
Tanaka et al.

(10) Patent No.: US 7,016,671 B2
(45) Date of Patent: Mar. 21, 2006

(54) TEST SYSTEM FOR MOBILE COMMUNICATION TERMINAL IN WHICH RESULT OF CONNECTION-TRANSITION TEST CAN BE DIRECTLY AND VISUALLY GRASPED

(75) Inventors: Hideki Tanaka, Kanagawa-ken (JP); Makoto Onuki, Kanagawa-ken (JP)

(73) Assignee: Anritsu Corporation, Atsugi (JP)

( * ) Notice: Subject to any disclaimer, the term of this patent is extended or adjusted under 35 U.S.C. 154(b) by 16 days.

(21) Appl. No.: 10/803,061

(22) Filed: Mar. 16, 2004

(65) Prior Publication Data

US 2004/0192289 A1    Sep. 30, 2004

(30) Foreign Application Priority Data

Mar. 24, 2003  (JP)  ............................. 2003-081443

(51) Int. Cl.
*H04Q 7/20*  (2006.01)
*H04B 17/00*  (2006.01)
*H04M 1/24*  (2006.01)

(52) U.S. Cl. ................ 455/423; 455/67.11; 455/115.1; 455/115.2; 455/115.4; 455/226.1; 455/226.4; 379/1.01; 379/1.03; 379/1.04

(58) Field of Classification Search ................ 455/423, 455/67.11, 115.1, 115.2, 115.4, 226.1, 226.4; 379/1.01, 1.03, 1.04
See application file for complete search history.

(56) References Cited

U.S. PATENT DOCUMENTS

| 5,901,364 | A |   | 5/1999  | Zetterblad |          |
|-----------|---|---|---------|------------|----------|
| 6,011,830 | A | * | 1/2000  | Sasin et al. | 379/10.03 |
| 6,061,393 | A | * | 5/2000  | Tsui et al. | 375/224  |
| 6,308,064 | B1 |  | 10/2001 | Green      |          |
| 6,724,730 | B1 | * | 4/2004  | Mlinarsky et al. | 370/241 |
| 6,785,540 | B1 | * | 8/2004  | Wichelman  | 455/423  |

(Continued)

FOREIGN PATENT DOCUMENTS

DE           41 24 617 A1    1/1993

(Continued)

OTHER PUBLICATIONS

"Universal Mobile Telecommunications System (UMTS); Terminal Conformance Specification, Radio Transmission and Reception (FDD) (3GPP TS 34.121. Version 3.11.0 Release 1999); ESTSE TS 134 121" ETSI STANDARDS, EUROPEAN TELECOMMUNICATIONS STANDARDS INSTITUTE, SOPHIA-ANTIPO, FR, vol. 3-tl, No. V3110, Dec. 2002, XP014010317, ISSN: 0000-001.

(Continued)

*Primary Examiner*—Joseph Feild
*Assistant Examiner*—S. Smith
(74) *Attorney, Agent, or Firm*—Frishauf, Holtz, Goodman & Chick, P.C.

(57) ABSTRACT

A test procedure control unit outputs control information for carrying out a transition test of a mobile communication terminal (UE) of a cellular system for a predetermined number of times. A transmitting/receiving unit transmits test signals corresponding to cells toward the UE, and receives a response signal from the UE. A reception measurement unit measures a transition time of the UE. A deciding unit whether a transition of the UE is a success or a failure within a predetermine time. A statistical processing unit classifies the measured results in the predetermined number of times into time zones, and carries out a totalization of the number of times of the measured results of the respective transition times corresponding to the respective time zones. An indication control unit causes an indicating unit to indicate, a distribution of the number of times of the tests with respect to a transition time based on the totalized results by graphical indication, and the distribution so as to distinguish the time zones of the successes/failures.

21 Claims, 7 Drawing Sheets

U.S. PATENT DOCUMENTS

| | | |
|---|---|---|
| 6,804,512 B1 | 10/2004 | Baker et al. |
| 2002/0183054 A1 | 12/2002 | Rimoni et al. |
| 2003/0045281 A1 | 3/2003 | Rimoni |
| 2005/0037761 A1 | 2/2005 | Baker et al. |

FOREIGN PATENT DOCUMENTS

| | | |
|---|---|---|
| DE | 100 40 445 C1 | 3/2002 |
| EP | 0 558 465 A2 | 9/1993 |
| WO | WO 00/31895 A | 6/2000 |
| WO | WO 01/41485 A1 | 6/2001 |

OTHER PUBLICATIONS

CHANG, Soon Kang et al., "CDMA Mobile Communication System Performance Analysis Tools for Network Parameter Planning" Vehicular Technology Conference, 1996, IEEE 46$^{th}$ Atlanta, GA, USA, Apr. 28-May 1, 1996, New York, NY, USA, IEEE, US, vol. 2, Apr. 28, 1996, pp. 894-898, XP010162518, ISBN: 0-7803-3157-5.

* cited by examiner

TEST SYSTEM FOR MOBILE COMMUNICATION TERMINAL IN WHICH RESULT OF CONNECTION-TRANSITION TEST CAN BE DIRECTLY AND VISUALLY GRASPED

CROSS-REFERENCE TO RELATED APPLICATIONS

This application is based upon and claims the benefit of priority from prior Japanese Patent Application No. 2003-081443, filed Mar. 24, 2003, the entire contents of which are incorporated herein by reference.

BACKGROUND OF THE INVENTION

1. Field of the Invention

The present invention relates to a test system for a mobile communication terminal which has a system simulator function capable of communication-connection with a mobile communication terminal, and which is for testing whether or not a connection state of the mobile communication terminal appropriately transits among cells in accordance with movement of the mobile communication terminal among the cells by using a mobile communication terminal of a cellular system which moves among cells (units of service areas of respective base stations), and in particular, to a test system for a mobile communication terminal in which a technique is used that, when a connection-transition test in which the a mobile communication terminal is made to artificially transit among the cells and switch the connection state is executed many times, and the respective results are statically evaluated, an operator can directly and visually grasp the evaluation quantitatively.

2. Description of the Related Art

Conventionally, for example, a cellular system is known as one of the communication systems using a mobile communication terminal such as a car telephone or a portable telephone.

FIG. 7 is a diagram for explanation of the relationship among cells (service areas).

That is, as shown in FIG. 7, in a communication system using base stations inn terminal 1 such as a car telephone or a portable telephone, as the cellular system, respective base stations 11, 12, 13, 14, . . . make the mobile communication terminal 1 be able to carry out communication by registering a position of the mobile communication terminal 1 when the mobile communication terminal 1 comes into cells 21, 22, 23, 24, . . . which are the service areas called cells, respectively.

For example, when the mobile communication terminal 1 moves from the cell 21 to the cell 22, in a case where the cell 21 and the cell 22 can receive communication services from both of the base stations 11 and 12, the mobile communication terminal 1 can use incoming radio waves whose power is stronger power among the incoming ratio waves of the both cells, or can use the incoming waves from the both cells.

In this case, when the mobile communication terminal 1 moves among the cells as described above, the mobile communication terminal 1 automatically switches the connection state from the base station 11 to the base station 12 (hereinafter, this is called "a transition of the connection state").

Accordingly, at the manufacturer of the mobile communication terminal 1, it is necessary to test in advance, before the shipping of the mobile communication terminal 1, whether or not the transition of the connection state is correctly executed in the mobile communication terminal 1, and how the communication quality is at that time, for example, the error rate of the data.

At the time of carrying out such a test, a method has been used in which the mobile communication terminal 1 itself is not moved and the position thereof is fixed, and test signals corresponding to the cells 21, 22, 23, 24, . . . are generated at the test system side, and by carrying out dummy communication with the mobile communication terminal 1 in accordance with a protocol along the communication system, the transition and the quality of the connection state of the mobile communication terminal 1 are tested.

Namely, at the test system side, a system simulator is configured, and the system simulator communicating with the mobile communication terminal 1, whereby the tests for the transition and the quality of the connection state of the mobile communication terminal 1 are carried out.

As a method for testing a mobile communication terminal in such a communication system, for example, there is an RRM (Radio Resource Management) test in accordance with the regulation described in "3GPP TS 34. 121, V3. 11. 0, December 2002, 3GPP Organizational Partners (ARIB, CWTS, ETSI, T1, TTA, TTC), France, P. 316–330" which is the test regulation in the W-CDMA communication system.

To put it simply, the RRM test is that a connection test with a base station or a procedure test with respect to a mobile communication terminal is carried out.

FIG. 8 is a functional block diagram showing a configuration of the conventional test system for a mobile communication terminal in which the RRM test is carried out.

In FIG. 8, the transmitting/receiving unit 3 has functions of respective transmitter/receivers $3a$, $3b$, $3c$, $3d$, . . . which correspond to the cells 21, 22, 23, 24, . . . of FIG. 7.

Further, the functions of the respective transmitter/receivers $3a$, $3b$, $3c$, $3d$, . . . naturally include a function of carrying out communication connection by exchanging necessary messages with the mobile communication terminal (UE: User Equipment) 1 in accordance with a predetermined protocol in the same way as in the base stations 11, 12, 13, 14, . . . of FIG. 7.

The transmitting/receiving unit 3 transmits predetermined test signals to the mobile communication terminal 1 via a connecting unit 2 by the functions of the respective transmitter/receivers $3a$, $3b$, $3c$, $3d$, . . . .

A reception measurement unit 4 has a function of confirming a transition and testing a quality of the connection state of the mobile communication terminal 1 by analyzing and measuring a response signal transmitted from the mobile communication terminal 1 due to the communication connection between the transmitting/receiving unit 3 and the mobile communication terminal 1.

Note that the transmitting/receiving unit 3 and the reception measurement unit 4 are configured so as to operate synchronously with one another in time.

Further, the reception measurement unit 4 has a function of time measurement or the like.

Because the mobile communication terminal 1 carries out transmission and reception with the transmitting/receiving unit 3 by radio propagation signals, the reception measurement unit 4 is configured so as to have a spectrum analyzer or the like which can measure the spectrum, the band, power, or the like of the propagation signals, built-in in order to test the characteristic of the propagation signal at a radio frequency region.

With respect to the time measurement at the reception measurement unit 4, a response signal from the mobile communication terminal 1 is received in response to the test signal from the transmitting/receiving unit 3, and that time is measured.

For example, the reception measurement unit 4 measures the time by carrying out time region measurement in the same way as in an oscilloscope by converting the received frequency from the mobile communication terminal 1 into an intermediate frequency by the built-in spectrum analyzer, and a time-sweeping at the intermediate frequency.

As described above, the transmitting/receiving unit 3 and the reception measurement unit 4 have both of the system simulator function and the measuring function (testing function).

In the following description, there are cases in which the transmitting/receiving unit 3 and the reception measurement unit 4 are collectively called a system simulator.

At the connecting unit 2, the mobile communication terminal 1 and the system simulator may be connected to one another in both directions by a cable, or may be connected to one another via an antenna.

A test procedure control unit 5 has a time setting unit 5*a*, and controls the system simulator by outputting control information including time setting information along the testing method in the above-described communication method, for example, the RRM test procedure of the W-CDMA as described above.

In particular, in the communication system as described above, when the mobile communication terminal 1 moves among the cells, this mobile communication terminal 1 completing the switching of receipt and the registering, and then transiting so that receipt of a predetermined quality is possible, within a predetermined time-passage, are determined in accordance with regulations. Therefore, the mobile communication terminal 1 must satisfy these sequential operations.

Accordingly, the test procedure control unit 5 has a predetermined procedure for causing the mobile communication terminal 1 to carry out the sequential operations along the regulation via the system simulator.

When the system simulator is operating in accordance with the setting at the time setting unit 5*a* of the test procedure control unit 5, a deciding unit 6 decides whether or not the transition, among the cells of the connection state at the mobile communication terminal 1 is being carried out within a predetermined time by repeating the test many times, for example, 1000 times.

The deciding unit 6 statistically determines the results of the repetitive decisions, and outputs the final test results as numeric data to an indicating unit 9 or the like.

In the test system for the mobile communication terminal according to the prior art, an indication on the indicating unit 9 depends on the numeric indication by only numeric data in accordance with each measurement item.

Accordingly, in the test system for the mobile communication terminal according to the prior art, for example, the rate of the successes (pass: success in separating from one cell and connecting to the other cell) and the failures (fail: error in separating from one cell and connecting to the other cell) of the scheduled transition of the connection among the cells at the time of repeating testing 1000 times, is numerically indicated.

Further, in the test system for the mobile communication terminal according to the prior art, there are cases in which the rate of failures exceeds a predetermined allowable range, and in which the number of times thereof is indicated numerically, and the like.

However, in the test system for the mobile communication terminal in accordance with the prior art as described above, the indication of the test result of the transition test or the like of the connection state, by the system simulator, of the mobile communication terminal depends on the numerical indication by only numeric data. Therefore, there is the problem that the operator cannot directly and visually grasp the final test result quantitatively, and cannot grasp how the result of the test in progress were, and what movement and what tendency the result of the test in progress will show from this time force.

BRIEF SUMMARY OF THE INVENTION

An object of the present invention is to provide a test system for a mobile communication terminal which is configured such that an operator can directly and visually grasp quantitatively the test result of a transition test of a connection state, by a system simulator, of a mobile communication terminal, and can visually grasp the test results in progress and the movement and tendency thereof.

In order to achieve the above object, according to a first aspect of the present invention, there is provided a test system for a mobile communication terminal, comprising:

a test procedure control unit (5) which possesses a procedure for carrying out a transition test of a connection state of a mobile communication terminal of a cellular system for a predetermined number of times, and outputs control information including time setting information in accordance with the procedure;

a transmitting/receiving unit (3) which, in accordance with the control information from the test procedure control unit, generates a plurality of test signals corresponding to a plurality of cells in the cellular system, varies the plurality of test signals so as to be successively stronger in accordance with a scheduled time-passage and transmits the signals toward the mobile communication terminal, and receives a response signal from the mobile communication terminal;

a reception measurement unit (4) which measures a transition time that is a time when the mobile communication terminal switches from a state of receiving a first test signal showing the greatest strength at the current point in time among the plurality of test signals, to a state of receiving a second test signal becoming the greatest strength next time among the plurality of test signals accompanying that the plurality of test signals are varied so as to be successively stronger in accordance with the scheduled time-passage, according to the response signal from the mobile communication terminal;

a deciding unit (6) which receives a measured result of the transition time from the reception measurement unit, and in accordance with the control information from the test procedure control unit, carries out a decision on success/failure whether a transition in which the mobile communication terminal switches from the state of receiving the first test signal among the plurality of test signals corresponding to the plurality of cells to the state of receiving the second test signal, is a success or a failure within a predetermined time;

a statistical processing unit (9) which receives a measured result of respective transition times in the predetermined number of times of the transition tests from the reception measurement unit, classifies the measured results of the respective transition times into a plurality of time zones, and carries out a totalization of the number of times of the measured results of the respective transition times corresponding to the respective time zones in the plurality of time zones;

an indicating unit (7) which indicates a result of the transition test of the connection state of the mobile communication terminal; and an indication control unit (8) which receives a result of the totalization by the statistical processing unit and results of the respective decisions on successes/failures in the predetermined number of times of the transition tests from the deciding unit, and causes the indicating unit to indicate, as the result of the transition test of the connection state of the mobile communication terminal, a distribution of the number of times of the tests with respect to a transition time by graphical indication based on the totalized results of the number of times of the measured results of the respective transition times corresponding to the respective time zones in the plurality of time zones, and to distinctively indicate the distribution so as to be able to distinguish the time zones of the successes/failures in the predetermined number of times of the transition tests.

In order to achieve the above object, according to a second aspect of the present invention, there is provided a test system for a mobile communication terminal according to the first aspect, wherein the statistical processing unit (9) receives the results of respective decisions on successes/failures in the predetermined number of times of the transition tests from the deciding unit, and carries out a calculation of at least one of the successes/failures at the respective times, and the indication control unit (8) receives a result of at least one of the rates of successes/failures at the respective times from the statistical processing unit, and causes the indicating unit to plot and indicate at least one of the rates of successes/failures at the respective times as the result of the transition test of the connection state of the mobile communication terminal.

In order to achieve the above object, according to a third aspect of the present invention, there is provided a test system for a mobile communication terminal according to the second aspect, wherein the statistical processing unit carries out a calculation of a success rate={the number of times of successes from the (K-N)th test to the Kth test}/N (provided that N=a predetermined number of times), in the case where the Kth test is currently being carried out, and instructs the indication control unit to plot and indicate the success rate for each time on the indicating unit.

In order to achieve the above object, according to a fourth aspect of the present invention, there is provided a test system for a mobile communication terminal according to the second aspect, wherein the statistical processing unit carries out a calculation of a failure rate={the number of times of failures from the (K-N)th test to the Kth test}/N, provided that N=a predetermined number of times, in the case where the Kth test is currently being carried out, and instructs the indication control unit to plot and indicate the failure rate for each time on the indicating unit.

In order to achieve the above object, according to a fifth aspect of the present invention, there is provided a test system for a mobile communication terminal according to the second aspect, wherein the statistical processing unit (9) estimates a tendency of a calculated value of the rate from the current number of times to the scheduled number of times based on a calculated value of at least one of the rates of the successes/failures at the respective times in the past, at a stage on the way of the predetermined number of times of the transition tests, and instructs the indication control unit to plot and indicate an estimated value for each time as an estimated line on the indicating unit.

In order to achieve the above object, according to a sixth aspect of the present invention, there is provided a test system for a mobile communication terminal according to the first aspect, wherein the test procedure control unit (5) has a computer (PC) and computer readable program code means (CRC) for causing the computer to carry out a transition test of a connection state of a mobile communication terminal of a cellular system for a predetermined number of times, and outputs control information including time setting information in accordance with the computer readable program code means.

In order to achieve the above object, according to a seventh aspect of the present invention, there is provided a test system for a mobile communication terminal according to the sixth aspect, wherein the deciding unit (6), the statistical processing unit (9), and the indication control unit (8) are constructed as software of the computer together with the test procedure control unit (5).

In order to achieve the above object, according to an eighth aspect of the present invention, there is provided a test system for a mobile communication terminal according to the seventh aspect, wherein the computer readable program code means (CRC) comprises:

first computer readable program code means for causing the transmitting/receiving unit (3) to generate a plurality of test signals corresponding to a plurality of cells in the cellular system in accordance with the control information from the test procedure control unit, to vary the plurality of test signals so as to be successively stronger in accordance with a scheduled time-passage and transmit the signals toward the mobile communication terminal, and to receive a response signal from the mobile communication terminal;

second computer readable program code means for causing the reception measurement unit (4) to measure a transition time that is a time when the mobile communication terminal switches from a state of receiving a first test signal showing the greatest strength at the current point in time among the plurality of test signals, to a state of receiving a second test signal becoming the greatest strength next time among the plurality of test signals accompanying that the plurality of test signals are varied so as to be successively stronger in accordance with the scheduled time-passage, according to the response signal from the mobile communication terminal;

third computer readable program code means for causing the deciding unit (6) to receive a measured result of the transition time from the reception measurement unit, and to carry out a decision on success/failure whether a transition in which the mobile communication terminal switches from the state of receiving the first test signal among the plurality of test signals corresponding to the plurality of cells to the state of receiving the second test signal is a success or a failure within a predetermined time, in accordance with the control information from the test procedure control unit; and fourth computer readable program code means for causing the statistical processing unit (9) to receive measured results of the respective transition times in the predetermined number of times of the transition tests from the reception measurement unit, to classify the measured results of the respective transition times into a plurality of time zones, and to carry out a totalization of the number of times of the measured results of the respective transition times corresponding to the respective time zones in the plurality of time zones; and fifth computer readable program code means for causing the indication control unit (8) to receive a result of the totalization by the statistical processing unit and results of the respective decisions on successes/failures of the predetermined number of times of the transition tests from the deciding unit, and for causing the indicating unit to indicate, as the result of the transition test of the connection state of the mobile communication terminal, a distribution of the number of times of the tests with respect to the transition time by the graphical indication based on the totalized results of the number of times of the measured results of the respective transition times corresponding to the respective time zones in the plurality of time zones, and to distinctively indicate the distribution to be able to distinguish the time zones of the successes/failures in the predetermined number of times of the transition tests.

In order to achieve the above object, according to a ninth aspect of the present invention, there is provided a test system for a mobile communication terminal according to the eighth aspect, wherein the computer readable program code means (CRC) further comprises:

sixth computer readable program code means for causing the statistical processing unit (9) to receive the results of the respective decisions on successes/failures in the predetermined number of times of the transition tests from the deciding unit, and to carry out a calculation of at least one of the rates of successes/failures at the respective times; and seventh computer readable program code means for causing the indication control unit (8) to receive the result of the calculation of at least one of the rates of successes and failures at the respective times from the statistical processing unit, and for causing the indicating unit to plot and indicate at least one of the rates of successes and failures at the respective times as the result of the transition test of the connection state of the mobile communication terminal.

In order to achieve the above object, according to a tenth aspect of the present invention, there is provided a test system for a mobile communication terminal according to the ninth aspect, wherein the sixth computer readable program code means causes the statistical processing unit to carry out a calculation of a success rate={the number of times of successes from the (K-N)th test to the Kth test}/N, (provided that N=a predetermined number of times) in the case where the Kth test is currently being carried out, and the seventh computer readable program code means instructs the indication control unit to plot the success rate obtained by the calculation for each time and indicate it on the indicating unit.

In order to achieve the above object, according to an eleventh aspect of the present invention, there is provided a test system for a mobile communication terminal according to the ninth aspect, wherein the sixth computer readable program code means causes the statistical processing unit to carry out a calculation of a failure rate={the number of times of failures from the (K-N)th test to the Kth test}/N, provided that N=a predetermined number of times, in the case where the Kth test is currently being carried out, and the seventh computer readable program code means instructs the indication control unit to plot the failure rate obtained by the calculation for each time and indicate it on the indicating unit.

In order to achieve the above object, according to a twelfth aspect of the present invention, there is provided a test system for a mobile communication terminal according to the ninth aspect, wherein the sixth computer readable program code means causes the statistical processing unit (9) to estimate a tendency of the calculated value of the rate from the current number of times to the scheduled number of times based on the calculated value of at least one of the rates of successes and failures at the respective times, at the stage on the way of the predetermined number of times of the transition tests, and the seventh computer readable program code means instructs the indication control unit to plot and indicate the estimated value for each time as the estimated line on the indicating unit, based on the estimation of the tendency of the calculated value of the rate from the current number of times to the scheduled number of times.

In order to achieve the above object, according to a thirteenth aspect of the present invention, there is provided a method for testing a mobile communication terminal, comprising:

preparing a test procedure control unit (5) which possesses a procedure for carrying out a transition test of a connection state of a mobile communication terminal of a cellular system for a predetermined number of times, and outputs control information including time setting information in accordance with the procedure;

in accordance with the control information from the test procedure control unit, generating a plurality of test signals corresponding to a plurality of cells in the cellular system, and varying the plurality of test signals so as to be successively stronger in accordance with a scheduled time-passage and transmitting the signals toward the mobile communication terminal;

in accordance with a response signal from the mobile communication terminal, measuring a transition time that is a time when the mobile communication terminal switches from a state of receiving a first test signal showing the greatest strength at the current point in time among the plurality of test signals, to a state of receiving a second test signal becoming the greatest strength in the next point in time among the plurality of test signals accompanying that the plurality of test signals are varied so as to be successively stronger in accordance with the scheduled time-passage;

receiving a measured result of the transition time, and in accordance with the control information from the test procedure control unit, carrying out a decision on success/failure whether a transition in which the mobile communication terminal switches from the state of receiving the first test signal among the plurality of test signals corresponding to the plurality of cells to the state of receiving the second test signal, is a success or a failure within a predetermined time;

receiving measured results of respective transition times in the predetermined number of times of the transition tests, classifying the measured results of the respective transition times into a plurality of time zones, and carrying out a totalization of the number of times of the measured results of the respective transition times corresponding to respective time zones in the plurality of time zones; and receiving a result of the totalization and results of the respective decisions on successes/failures in the predetermined number of times of the transition tests, and causing an indicating unit to indicate, as the result of the transition test of the connection state of the mobile communication terminal, a distribution of the number of times of the tests with respect to a transition time by graphical indication based on the totalized results of the number of times of the measured results of the respective transition times corresponding to the respective time zones in the plurality of time zones, and to distinctively indicate the distribution so as to be able to distinguish the time zones of the successes/failures in the predetermined number of times of the transition tests.

In order to achieve the above object, according to a fourteenth aspect of the present invention, there is provided a test system for a mobile communication terminal, comprising:

test procedure control means (5) for possessing a procedure for carrying out a transition test of a connection state of a mobile communication terminal of a cellular system for a predetermined number of times, and outputting control information including time setting information in accordance with the procedure;

transmitting/receiving means (3) for, in accordance with the control information from the test procedure control means, generating a plurality of test signals corresponding to a plurality of cells in the cellular system, varying the plurality of test signals so as to be successively stronger in accordance with a scheduled time-passage and transmitting the signals toward the mobile communication terminal, and receiving a response signal from the mobile communication terminal;

reception measurement means (4) for, in accordance with the response signal from the mobile communication terminal, measuring a transition time that is a time when the mobile communication terminal switches from a state of receiving a first test signal showing the greatest strength at the current point in time among the plurality of test signals, to a state of receiving a second test signal becoming the greatest strength next time among the plurality of test signals accompanying that the plurality of test signals are varied so as to be successively stronger in accordance with the scheduled time-passage;

deciding means (6) for receiving a measured result of the transition time from the reception measurement means, and in accordance with the control information from the test procedure control means, carrying out a decision on success/failure whether a transition in which the mobile communication terminal switches from the state of receiving the first test signal among the plurality of test signals corresponding to the plurality of cells to the state of receiving the second test signal, is a success or a failure within a predetermined time;

statistical processing means (9) for receiving a measured result of the respective transition times in the predetermined number of times of the transition tests from the reception measurement means, classifying the measured results of the respective transition times into a plurality of time zones, and carrying out a totalization of the number of times of the measured results of the respective transition times corresponding to the respective time zones in the plurality of time zones;

indicating means (7) for indicating a result of the transition test of the connection state of the mobile communication terminal; and indication control means (8) for receiving a result of the totalization by the statistical processing means and results of the respective decisions on successes/failures in the predetermined number of times of the transition tests from the deciding means, and causing the indicating means to indicate, as the result of the transition test of the connection state of the mobile communication terminal, a distribution of the number of times of the tests with respect to a transition time by graphical indication based on the totalized results of the number of times of the measured results of the respective transition times corresponding to the respective time zones in the plurality of time zones, and to distinctively indicate the distribution so as to be able to distinguish the time zones of the successes/failures in the predetermined number of times of the transition tests.

In order to achieve the above object, according to a fifteenth aspect of the present invention, there is provided a test system for a mobile communication terminal according to the fourteenth aspect, wherein the statistical processing means (9) receives the results of respective decisions on successes/failures in the predetermined number of times of the transition tests from the deciding means, and carries out a calculation of at least one of the successes/failures at the respective times, and the indication control means (8) receives a result of at least one of the rates of successes/failures at the respective times from the statistical processing means, and causes the indicating means to plot and indicate at least one of the rates of successes/failures at the respective times as the result of the transition test of the connection state of the mobile communication terminal.

In order to achieve the above object, according to a sixteenth aspect of the present invention, there is provided a test system for a mobile communication terminal according to the fifteenth aspect, wherein the statistical processing means (9) estimates a tendency of a calculated value of the rate from the current number of times to the scheduled number of times based on a calculated value of at least one of the rates of the successes/failures at the respective times in the past, at a stage on the way of the predetermined number of times of the transition tests, and instructs the indication control means to plot and indicate an estimated value for each time as an estimated line on the indicating means.

In order to achieve the above object, according to a seventeenth aspect of the present invention, there is provided a test system for a mobile communication terminal according to the fourteenth aspect, wherein the test procedure control means (5) has a computer (PC) and computer readable program code means (CRC) for causing the computer to carry out a transition test of a connection state of a mobile communication terminal of a cellular system for a predetermined number of times, and outputs control information including time setting information in accordance with the computer readable program code means.

In order to achieve the above object, according to an eighteenth aspect of the present invention, there is provided a test system for a mobile communication terminal according to the seventeenth aspect, wherein the deciding means (6), the statistical processing means (9), and the indication control means (8) are constructed as software of the computer together with the test procedure control means (5).

In order to achieve the above object, according to a nineteenth aspect of the present invention, there is provided a test system for a mobile communication terminal according to the eighteenth aspect, wherein the computer readable program code means (CRC) comprises:

first computer readable program code means for causing the transmitting/receiving means (3) to generate a plurality of test signals corresponding to a plurality of cells in the cellular system in accordance with the control information from the test procedure control means, to vary the plurality of test signals so as to be successively stronger in accordance with a scheduled time-passage and transmit the signals toward the mobile communication terminal, and to receive a response signal from the mobile communication terminal;

second computer readable program code means for causing the reception measurement means (4) to measure a transition time that is a time when the mobile communication terminal switches from a state of receiving a first test signal showing the greatest strength at the current point in time among the plurality of test signals, to a state of receiving a second test signal becoming the greatest strength next time among the plurality of test signals accompanying that the plurality of test signals are varied so as to be successively stronger in accordance with the scheduled time-passage, according to the response signal from the mobile communication terminal;

third computer readable program code means for causing the deciding means (6) to receive a measured result of the transition time from the reception measurement means, and to carry out a decision on success/failure whether a transition in which the mobile communication terminal switches from the state of receiving the first test signal among the plurality of test signals corresponding to the plurality of cells to the state of receiving the second test signal is a success or a failure within a predetermined time, in accordance with the control information from the test procedure control means; and fourth computer readable program code means for causing the statistical processing means (9) to receive measured results of the respective transition times in the predetermined number of times of the transition tests from the reception measurement means, to classify the measured results of the respective transition times into a plurality of time zones, and to carry out a totalization of the number of times of the measured results of the respective transition times corresponding to the respective time zones in the plurality of time zones; and fifth computer readable program code means for causing the indication control means (8) to receive a result of the totalization by the statistical processing means and results of the respective decisions on successes/failures of the predetermined number of times of the transition tests from the deciding means, and for causing the indicating means to indicate, as the result of the transition test of the connection state of the mobile communication terminal, a distribution of the number of times of the tests with respect to the transition time by the graphical indication based on the totalized results of the number of times of the measured results of the respective transition times corresponding to the respective time zones in the plurality of time zones, and to distinctively indicate the distribution to be able to distinguish the time zones of the successes/failures in the predetermined number of times of the transition tests.

In order to achieve the above object, according to a twentieth aspect of the present invention, there is provided a test system for a mobile communication terminal according to the nineteenth aspect, wherein the computer readable program code means (CRC) further comprises:

sixth computer readable program code means for causing the statistical processing means (9) to receive the results of the respective decisions on successes/failures in the predetermined number of times of the transition tests from the deciding means, and to carry out a calculation of at least one of the rates of successes/failures at the respective times; and seventh computer readable program code means for causing the indication control means (8) to receive the result of a calculation of at least one of the rates of successes and failures at the respective times from the statistical processing means, and for causing the indicating means to plot and indicate at least one of the rates of successes and failures at the respective times as the result of the transition test of the connection state of the mobile communication terminal.

In order to achieve the above object, according to a twenty-first aspect of the present invention, there is provided a test system for a mobile communication terminal according to the twentieth aspect, wherein the sixth computer readable program code means causes the statistical processing means (9) to estimate a tendency of the calculated value of the rate from the current number of times to the scheduled number of times based on the calculated value of at least one of the rates of successes and failures at the respective times, at the stage on the way of the predetermined number of times of the transition tests, and the seventh computer readable program code means instructs the indication control means to plot and indicate the estimated value for each time as the estimated line on the indicating means, based on the estimation of the tendency of the calculated value of the rate from the current number of times to the scheduled number of times.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
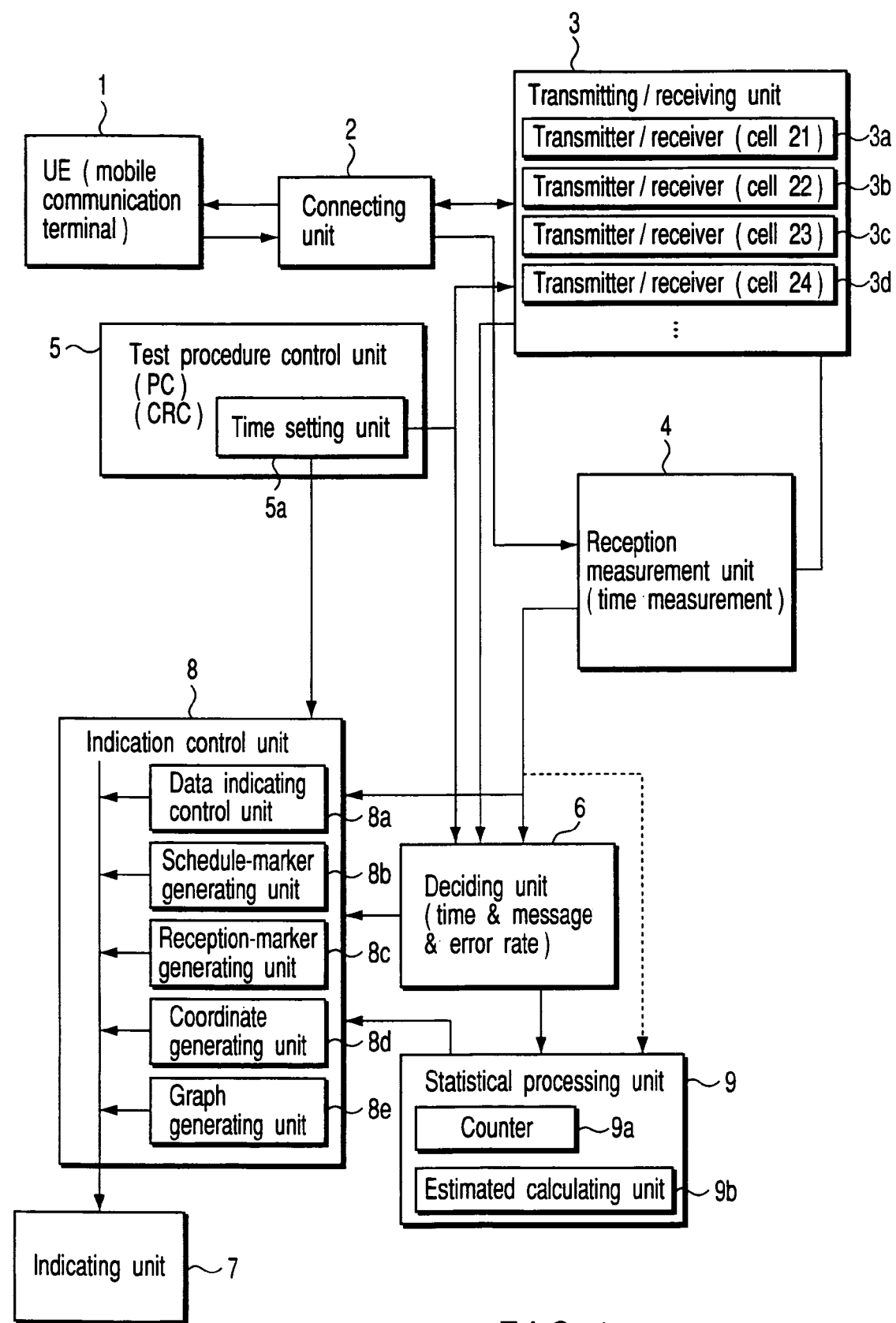
FIG. 1 is a functional block diagram showing a configuration of a test system for a mobile communication terminal according to one embodiment of the present invention.

Reference will now be made in detail to the presently preferred embodiments of the invention as illustrated in the accompanying drawings, in which like reference numerals designate like or corresponding parts.

A test system for a mobile communication terminal according to the present invention has the feature in that, when a transition of a connection state among cells of a mobile communication terminal 1 is tested for a predetermined time-passage, because an operator can visually recognize the situation, in a map form, in which the test is progressing for the time-passage, and can visually recognize a success or a failure in the transition of the connection state, and the number of times of the tests are made to be many, respective test results are quantitatively, or the quantitative variation-progress is indicated so as to be visually recognizable in accordance with the progress of the number of times (i.e., a time required for the number of times).

Hereinafter, the test system for a mobile communication terminal according to the invention will be described with reference to the drawings.

FIG. 1 is a diagram showing a functional configuration of the test system for a mobile communication terminal according to the invention.

FIGS. 2A to 5 are diagrams for explanation of an example of a transition of a connection state among the cells of the mobile communication terminal 1 to which the test system for a mobile communication terminal according to the invention is applied.

Figure 6A:
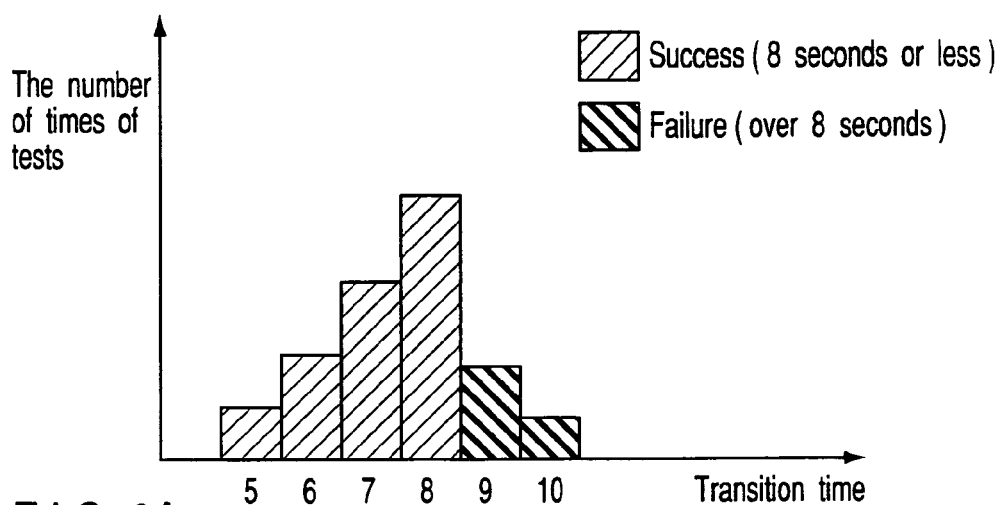
FIGS. 6A and 6B are diagrams for explanation of examples of indicating of data in which the results of the tests are statistically processed, of the mobile communication terminal 1 to which the test system for the mobile communication terminal of FIG. 1 is applied.
Figure 6B:
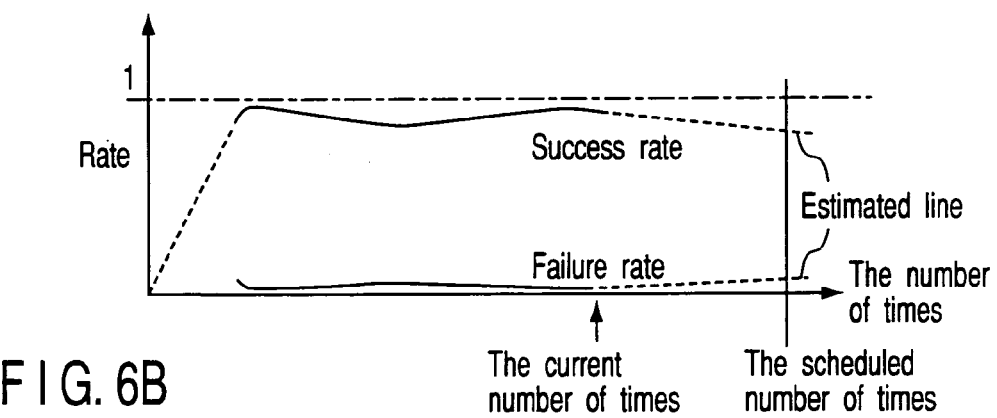
Figure 7:
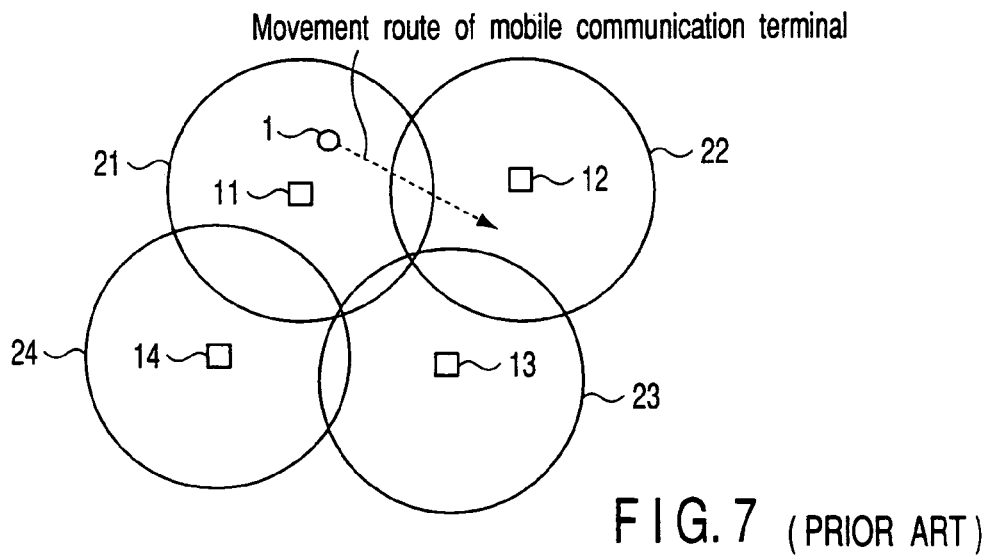
FIG. 7 is a diagram for explanation of the relationship between cells (service areas) and base stations in a cellular system conventionally known.

FIGS. 6A and 6B are diagrams showing examples in which a statistical evaluation in accordance with respective test results in the test system for the mobile communication terminal according to the invention is indicated so as to be quantitatively grasped.

First, a functional configuration of the test system for the mobile communication terminal according to the invention will be described based on FIG. 1.

FIG. 1 is the functional block diagram showing the configuration of one embodiment of a testing device for the mobile communication terminal according to the invention.

Figure 8:
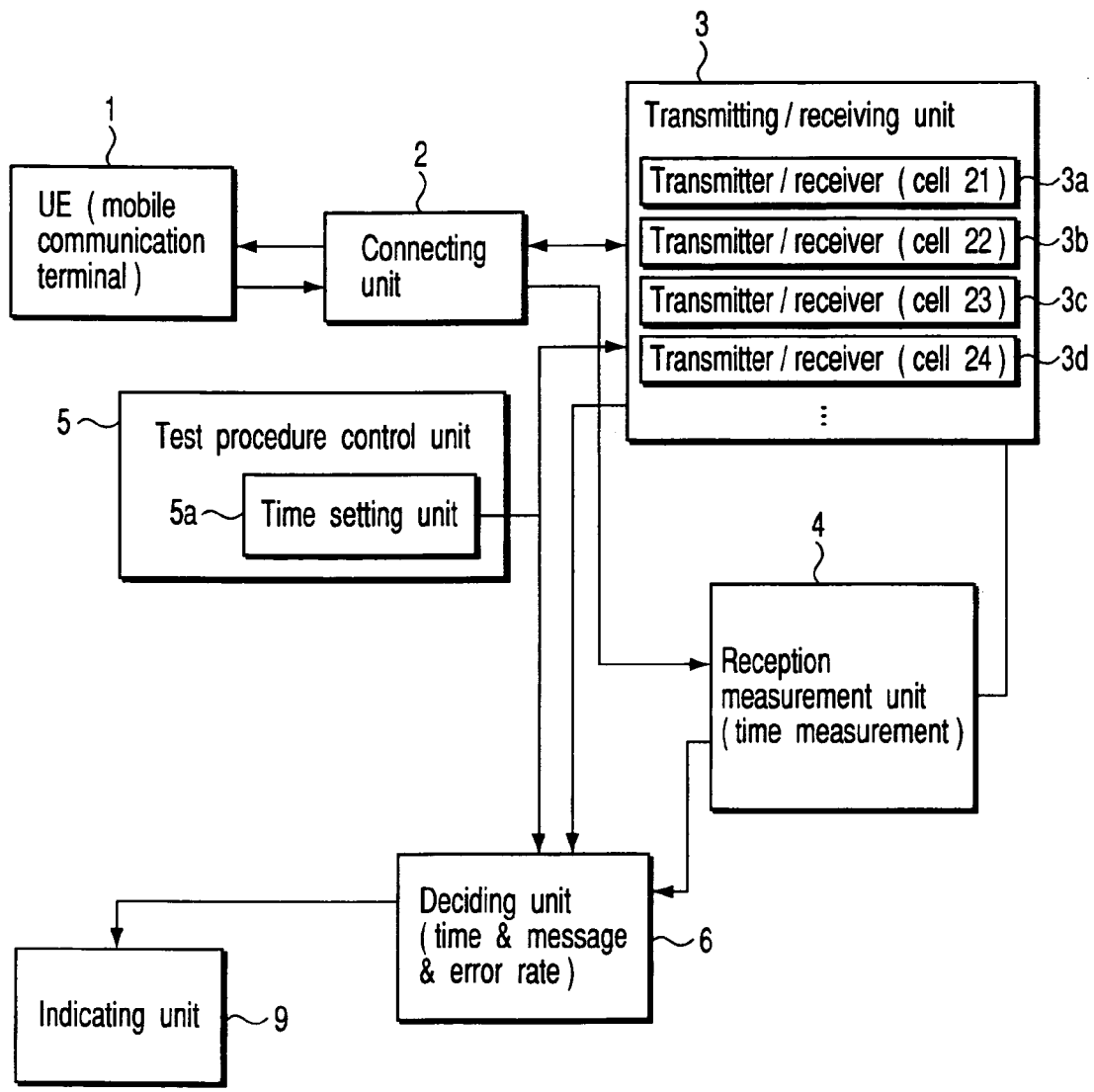
FIG. 8 is a functional block diagram showing a configuration of a conventional test system, which carries out RRM test, of a mobile communication terminal.

In FIG. 1, the functions of reference numerals which are the same as those of FIG. 8 described in the prior art are, except for that of the deciding unit 6, the same as the functions of those of FIG. 8 as well, and therefore, detailed descriptions thereof will be omitted.

As shown in FIG. 1, the mobile communication terminal testing device according to one embodiment of the invention is constituted of: a test procedure control unit 5 which possesses a procedure for testing a transition of a connection state of the mobile communication terminal 1 of a cellular system for a predetermined number of time, and outputs control information in accordance with the procedure; a transmitting/receiving unit 3 which generates a plurality of test signals corresponding to a plurality of cells in the cellular system in accordance with the control information from the test procedure control unit 5, varies the plurality of test signals so as to be successively stronger in accordance with a scheduled time-passage and transmits the signals toward the mobile communication terminal 1, and receives a response signal from the mobile communication terminal 1; a reception measurement unit 4 which measures a transition time that is a time when the mobile communication terminal 1 switches from a state of receiving a first test signal showing the greatest strength at the current point in time among the plurality of test signals, to a state of receiving a second test signal becoming the greatest strength next time among the plurality of test signals accompanying that the plurality of test signals are varied so as to be successively stronger in accordance with the scheduled time-passage, according to the response signal from the mobile communication terminal 1; a deciding unit 6 which receives a measured result of the transition time from the reception measurement unit 4, and in accordance with the control information from the test procedure control unit 5, carries out a decision on success/failure whether the transition in which the mobile communication terminal 1 switches from the state of receiving the first test signal among the plurality of test signals corresponding to the plurality of cells to the state of receiving the second test signal, is a success or a failure within a predetermined time; a statistical processing unit 9 which receives the measured results of the respective transition times in the predetermined number of times of the transition tests from the reception measurement unit 4, classifies the measured results of the respective transition times into a plurality of time zones, and carries out totalization of the number of times of the measured results of the respective transition time corresponding to respective time zones in the plurality of time zones; an indicating unit 7 which indicates the result of a transition test of the connection state of the mobile communication terminal 1; and an indication control unit 8 which receives the result of the totalization by the statistical processing unit 9 and the results of respective decisions on successes/failures in the predetermined number of times of the transition tests from the deciding unit, and causes the indicating unit 7 to indicate, as the result of the transition test of the connection state of the mobile communication terminal 1, a distribution of the number of times of the tests with respect to a transition time by graphical indication based on the totalized results of the number of times of the measured results of the respective transition times corresponding to the respective time zones in the plurality of time zones, and to distinctively indicate it so as to be able to distinguish the time zones of the successes/failures in the predetermined number of times of the transition tests.

Further, concretely, in FIG. 1, the deciding unit 6 decides whether or not the transition between cells of a connection state at the mobile communication terminal 1 is carried out within a predetermined time. As will be described in Example 2 which will be described later, the deciding unit 6 is configured so as to decide the contents of the message and the error rate in a test in which a call is carried out with a system simulator.

For example, as shown in FIG. 6A, the deciding unit 6 is configured so as to decide that the transition is a success when a transition of the connection state among the cells at the mobile communication terminal 1 is carried out within eight seconds, and so as to decide that the transition is a failure when the transition is carried out over eight seconds.

The deciding unit 6 is configured so as to receive in advance the time and the message which will be the standards at the time of deciding from the test procedure control unit 5a.

Further, the statistical processing unit 9 forms the featured portion of the present invention, and includes a counter 9a and an estimated calculating unit 9b, and counts the number of times of successes/failures by the deciding unit 6, and generates the statistical data in order to determine a distribution of the results decided by the deciding unit 6.

Namely, for example, as shown in FIG. 6A which will be described later, the statistical processing unit 9 makes successes and failures by the deciding unit 6 to be distinguishable by colors, patterns, reference numerals, or the like, and classifies the results measured by the reception measurement unit 4 in accordance with for each transition time, counts those, generates data made to be the distribution of the transition times vs. the number of times of tests, and instructs the graph generating unit 8e to indicate the data as a bar graph on the indicating unit 7.

In addition, for example, as shown in FIG. 6B which will be described later, if the Kth test is currently being carried out, the statistical processing unit 9 carries out a calculation of a success rate={the number of times of successes from the (K-N)th test to the Kth test}/N, provided that N=a predetermined number of times (for example, 50), and instructs the graph generating unit 8e to plot for each time and indicate it on the indicating unit 7.

The above-described equation shows an average value of the number of times of the successes at a span of N times (or a value in which the number of times of the successes is differentiated by a span of N), and an average fluctuation of the success rate can be seen.

In this case, N is preferably selected in accordance with the characteristic of the test.

In the same way, a failure rate can be expressed by a failure rate={the number of times of failures from the (K-N)th test to the Kth test}.

Note that, in FIG. 6B, the dotted lines from the current number of times and the scheduled number of times are estimated lines, and this is that the estimated calculating unit 9b of the statistical processing unit 9 indicates data showing the worst tendency from the same number of times (current number of times) to the scheduled number of times, as the worst estimated lines, for example, in the past test data.

In accordance therewith, the operator can estimate the tendency of the result of the test in progress from this time forth.

Namely, provided that the operator can estimate a success as a test even at the estimated worst value at the scheduled number of times, the operator can cancel the test at that point in time, and can decide that the transition test of the connection state among the cells of the mobile communication terminal 1 is a pass.

In accordance therewith, the operator can efficiently carry out the transition test of the connection state among the cells at the mobile communication terminal 1.

Moreover, as the method for estimating, for example, in the case where the test at the current point in time is the $600^{th}$ test among the scheduled 1000 times of tests, and the tendency from the $300^{th}$ test to the $600^{th}$ test is gradual, the operator may estimate a tendency from the $600^{th}$ test to the $1000^{th}$ test.

Note that, provided that the estimated processing unit 9b of the statistical processing unit 9 carries out processing in accordance with a statistical distribution (for example, the Poisson distribution), an estimation in the same way as described above can be carried out.

Note that, the statistical processing unit 9 counts the number of times of the successes/failures by the deciding unit 6, by the counter 9a, and generates the statistical data thereof by carrying out statistical processing thereon, in order to indicate the transition success rate for each time interval, for example, as carried out in Example 2 shown in FIG. 5 which will be described later, on the indication screen of the indicating unit 7 by the coordinate generating unit 8d, based on the result decided by the deciding unit 6.

Further, the indication control unit 8 forms the featured portion of the present invention, and is configured by including a data indication control unit 8a, a schedule-marker generating unit 8b, a reception-marker generating unit 8c, a coordinate generating unit 8d, and a graph generating unit 8e.

Here, in the same way as in the prior art as described above, the data indication control unit 8a indicates, for example, numeric data relating to the results which the deciding unit 6 decided by 1000 times of tests, or measured values measured by the reception measurement unit 4, or the like on an indication screen of the indicating unit 7.

The coordinate generating unit 8d forms in advance a coordinate for indicating the result of the measurement which has been scheduled on the indication screen of the indicating unit 7, on the indication screen of the indicating unit 7 in accordance with the measuring procedure which the test procedure control unit 5 stores therein along the regulation "3GPP TS 34. 121" in the above-described communication system of the W-CDMA.

Figure 2A:
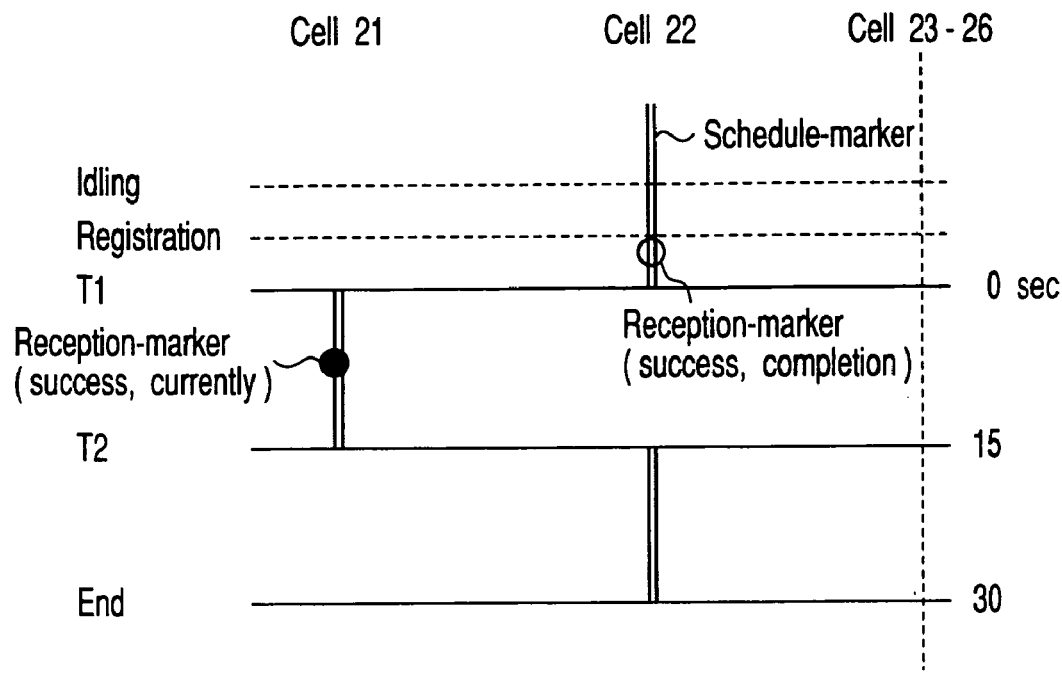
FIGS. 2A and 2B are diagrams for explanation of an example of a transition of a connection state, between cells, of a mobile communication terminal 1 to which the test system for the mobile communication terminal of FIG. 1 is applied.
Figure 2B:
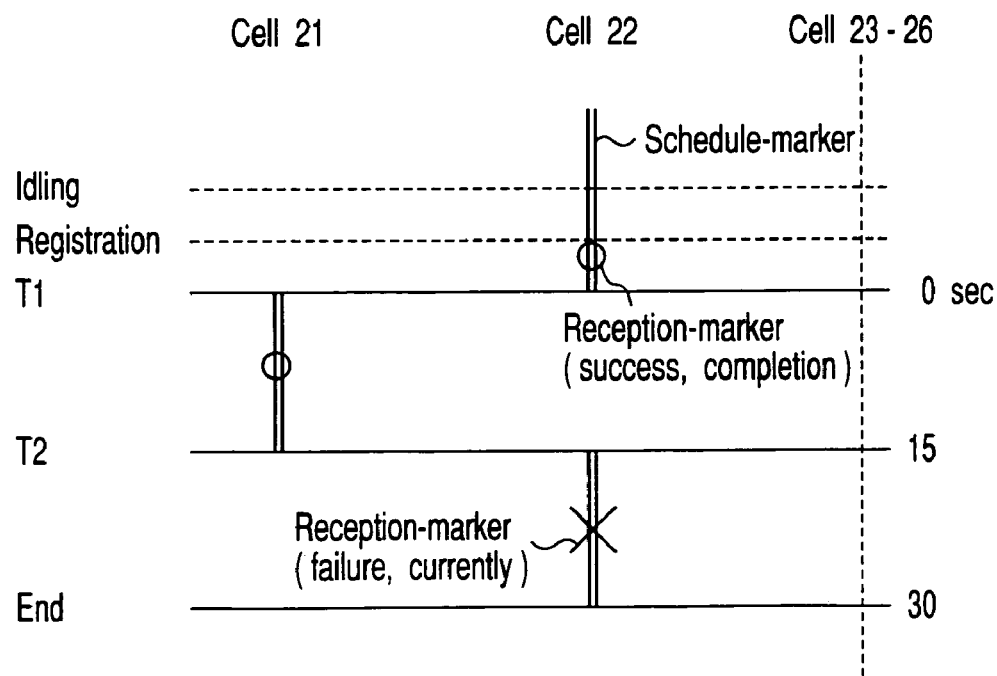

The coordinate generating unit 8d prepares, for example, as shown in FIGS. 2A and 2B, a two-dimensional coordinate space by taking cells 21, 22, 23, ... as the abscissas, and by taking the ordinate as a time base showing a state of transiting in accordance with a time-passage.

In this case, as a test plan, as shown in FIGS. 2A and 2B, because the mobile communication terminal 1 transits between the cell 21 and the cell 22, and the idling, the registration of position with the base station, and the transitions at times T1 and T2 are scheduled, those times are indicated on the indication screen of the indicating unit 7.

Accordingly, the coordinate generating unit 8d has calculating means for calculating in advance a position of the coordinate on the indication screen of the indicating unit 7.

The coordinate information is used for the schedule-marker generating unit 8b and the reception-marker generating unit 8c which will be described as follows.

Further, the schedule-marker generating unit 8b receives time information which is set by the time setting unit 5a in accordance with the procedure from the test procedure control unit 5, generates the schedule-markers shown by the double lines of FIGS. 2A and 2B at the coordinate space, and indicates the schedule-markers on the indication screen of the indicating unit 7.

FIGS. 2A and 2B show the states in which a schedule for carrying out a transition test of the connection state of the mobile communication terminal 1 is being indicated on the indication screen of the indicating unit 7, in the form that the mobile communication terminal 1 first receives the service by receiving the signal of the base station corresponding to the cell 22 up to T1, receives the service by receiving the signal corresponding to the base station of the cell 21 from T1 up to T2 (for 15 seconds), and receives the service of the cell 22 again from T2 to the end (for 15 seconds).

The positions of the above-described schedule-markers of the double line of FIGS. 2A and 2B show the transition schedule of the connection state of the mobile communication terminal 1.

In addition, the reception-marker generating unit 8c generates a reception-marker designated by ○ or a reception-marker designated by ● which shows the decided result by the deciding unit 6, and indicates the reception-marker on the schedule-marker generated and indicated by the schedule-marker generating unit 8b in the coordinate space on the indication screen of the indicating unit 7.

In FIGS. 2A and 2B, the reception-marker designated by ○ between the registration and T1 shows the state of being success and being completed due to the transition being carried out within the predetermined time (this case shows that the cell 22 receives first).

Furthermore, in FIG. 2A, the reception-marker designated by ● shows that the current time is within the time zone from T1 to T2, and the mobile communication terminal 1 is already switched from reception of the signal corresponding to the cell 22 to the signal corresponding to reception of cell 21 within a predetermined time, and the position of the reception-marker designated by ● shows the current time of the test, and shows the state of progress of the test as well, in addition to the above-described reception-marker designated by ○.

In FIG. 2B, a reception-marker designated by X shows an example in which the mobile communication terminal 1 failed in switching from reception of the cell 21 to reception of the cell 22 after T2.

Further, the graph generating unit 8e generates a graph which has a format such as a bar graph, a two dimensional coordinate indication, or the like, and which is for graphically indicating, for example, the test results of the 1000 times of tests on the indication screen of the indicating unit 7 based on the data from the statistical processing unit 9.

Note that the test procedure control unit 5 has a personal computer (PC) and computer readable program code means (CRC) in which a program for causing the computer (PC) to carry out transition tests of the connection state of the mobile communication terminal 1 of the cellular system a predetermined number of times, is recorded in advance on a recording medium. The test procedure control unit 5 is configured so as to output the control information including the time setting information along the computer readable program code means (CRC), whereby the test procedure control unit 5 may be configured so as to manage the entire control for carrying out transition tests of the connection state of the mobile communication terminal 1 the predetermined number of times via the system simulator.

Further, the deciding unit 6 and the indication control unit 8 may be constructed as software of the computer (PC) together with the test procedure control unit 5.

In this case, the computer readable program code means (CRC) comprises: first computer readable program code means for causing he transmitting/receiving unit 3 to generate a plurality of test signals corresponding to a plurality of cells in the cellular system in accordance with the control information from the test procedure control unit 5, to vary the plurality of test signals so as to be successively stronger in accordance with a scheduled time-passage and transmit the signals toward the mobile communication terminal 1, and to receive a response signal from the mobile communication terminal 1; second computer readable program code means for causing the reception measurement unit 4 to measure a transition time which is a time when the mobile communication terminal 1 switches from a state of receiving a first test signal showing the greatest strength at the current point in time among the plurality of test signals to a state of receiving a second test signal becoming the greatest strength next time among the plurality of test signals accompanying that the plurality of test signals are varied so as to be successively stronger in accordance with the scheduled time-passage, according to the response signal from the mobile communication terminal 1; third computer readable program code means for causing the deciding unit 6 to receive a measured result of the transition time from the reception measurement unit 4, and to carry out a decision on success/failure whether a transition in which the mobile communication terminal 1 switches from the state of receiving the first test signal among the plurality of test signals corresponding to the plurality of cells to the state of receiving the second test signal is a success or a failure within a predetermined time in accordance with the control information from the test procedure control unit 5; and fourth computer readable program code means for causing the statistical processing unit 9 to receive the measured results of the respective transition times in the predetermined number of times of the transition tests from the reception measurement unit 4, to classify the measured results of the respective transition times into a plurality of time zones, and to carry out totalization of the number of times of the measured results of the respective transition times corresponding to respective time zones in the plurality of time zones; fifth computer readable program code means for causing the indication control unit 8 to receive the result of the totalization by the statistical processing unit 9 and the results of the respective decisions on successes/failures of the predetermined number of times of the transition tests from the deciding unit, and for causing the indicating unit 7 to indicate, as the result of the transition test of the connection state of the mobile communication terminal 1, a distribution of the number of times of the tests with respect to the transition time by the graphical indication based on the totalized results of the number of times of the measured results of the respective transition times corresponding to the respective time zones in the plurality of time zones, and to distinctively indicate it to be able to distinguish the time zones of the successes/failures in the predetermined number of times of the transition tests.

In addition, the computer readable program code means (CRC) further comprises: sixth computer readable program code means for causing the statistical processing unit 9 to receive the respective results of the successes/failures in the predetermined number of times of the transition tests from the deciding unit 6, and to carry out a calculation of at least one the rates of successes and failures at the respective times; and seventh computer readable program code means for causing the indication control unit 8 to receive the result of at least one of successes and failures at the respective times from the statistical processing unit 9, and to plot and indicate at least one of the rates of successes and failures at the respective times as the result of the transition test of the connection state of the mobile communication terminal 1 on the indicating unit 7.

The sixth computer readable program code means causes the statistical processing unit 9 to carry out a calculation of a success rate={the number of times of successes from the (K-N)th test to the Kth test}/N, (provided that N=a predetermined number of times) if the Kth test is currently being carried out, and the seventh computer readable program code means instructs the indication control unit 8 to plot the success rate obtained by the calculation for each time and indicate it on the indicating unit 7.

Further the sixth computer readable program code means may cause the statistical processing unit 9 to carry out a calculation of a failure rate={the number of times of failures from the (K-N)th test to the Kth test}/N, provided that N=a predetermined number of times, if the Kth test is currently being carried out, and the seventh computer readable program code means may instruct the indication control unit 8 to plot the failure rate obtained by the calculation for each time and indicate it on the indicating unit 7.

Furthermore, it may be included that the sixth computer readable program code means causes the statistical processing unit 9 to carry out an estimation of a tendency of the calculated value of the rate from the current number of times to the scheduled number of times based on the calculated value of at least one of the rates of successes and failures at the respective times, at the stage on the way of the predetermined number of times of the transition tests, and the seventh computer readable program code means instructs the indication control unit 8 to plot the estimated value for each time and indicate it as the estimated lines on the indicating unit 7, based on the estimation of the tendency of the calculated value of the rate from the current number of times to the scheduled number of times.

EXAMPLE 1

Next, the flow of the concrete test operations of the test system for the mobile communication terminal in accordance with Example 1 of the present invention will be described with reference to FIGS. 1, 3A, 3B, 3C, 6A and 6B.

In this case, the test is carried out, for example, 1000 times.

(1) The Test is Started

In this case, in advance, the test procedure control unit 5 and the time setting unit 5a control the respective units of FIG. 1 in accordance with the measuring procedure in the regulation in the predetermined communication system as described above.

Figure 3A:
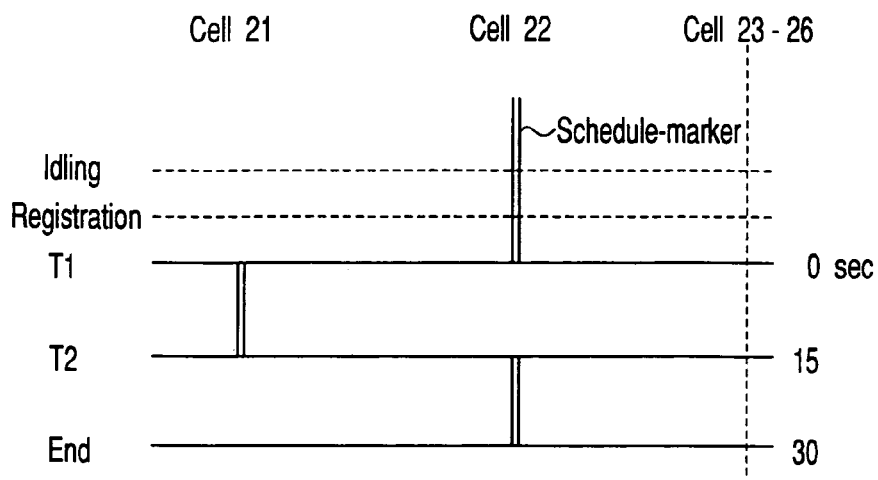
FIGS. 3A, 3B, and 3C are diagrams for explanation of another example of a transition of a connection state, among the cells, of the mobile communication terminal 1 to which the test system for the mobile communication terminal of FIG. 1 is applied.

First, the coordinate generating unit 8d receives time schedule information of the test from the time setting unit 5a, and indicates the cells 21, 22, . . . , and a time coordinate on the indication screen of the indicating unit 7 as shown in FIG. 3A.

Further, as shown in FIG. 3A, the schedule-marker generating unit 8b indicates the marker of the double line showing the state of transition which has been scheduled on the time coordinate of the indication screen of the indicating unit 7.

From the indication of FIG. 3A, the operator can understand that it is scheduled to receive the signal corresponding to the cell 22 up to T1, and to receive the signal corresponding to the cell 21 from T1 to T2, and to receive the signal corresponding to the cell 22 again thereafter.

(2) The transmitting/receiving unit 3 transmits the signal corresponding to the cell 22 so as to have a strength stronger than that of the signals corresponding to the other cells (other transmitter/receivers 3a, 3c, 3d, . . . ) to the mobile communication terminal 1 by using the transmitting/receiving unit 3b thereamong in accordance with an instruction from the test procedure control unit 5.

Note that the mobile communication terminal 1 is designed so as to receive a signal having the strongest strength (level, power) among the signals from the transmitting/receiving unit 3.

Figure 3B:
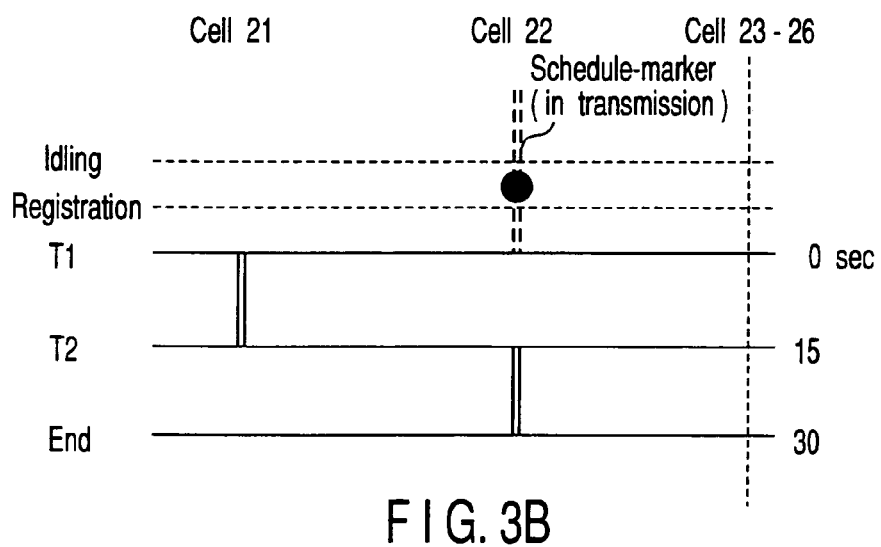

The schedule-marker generating unit 8b having received the information showing the state of the output of the transmitter/receiver 3b from the test procedure control unit 5 varies the initial schedule-marker of the solid line which has been indicated on the indication screen of the indicating unit 7 to the schedule-marker of the dotted line showing a state in which the transmitter/receiver 3b is transmitting as shown in FIG. 3B.

(3) The mobile communication terminal 1 starts preliminary idling for receiving the signal corresponding to the cell 22.

The transmitting/receiving unit 3 receives a response signal showing the idling start from the mobile communication terminal 1, and notifies the reception-marker generating unit 8c of it via the deciding unit 6.

The reception-marker generating unit 8c having received the notification indicates the reception-marker designated by ● showing the start of idling on the time base of the cell 22 within the time zone between the idling and the registration as shown in FIG. 3B.

(4) Moreover, the mobile communication terminal 1 carries out the registration of the position with the reception measurement unit 4 serving as a system simulator.

Figure 3C:
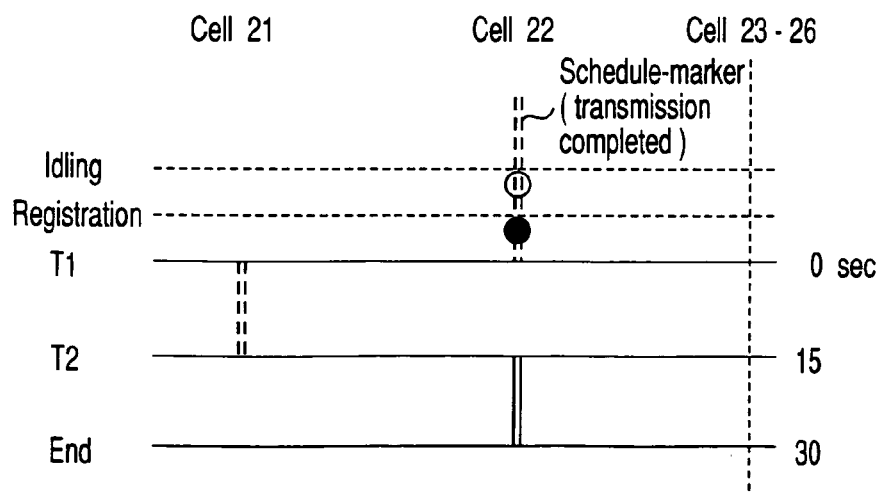

The reception-marker generating unit 8c having received the result of the registration of the position of the mobile communication terminal 1 from the reception measurement unit 4 indicates, on the indication screen of the indicating unit 7, as shown in FIG. 3C, the reception-marker designated by ● showing the meaning that the registration has succeeded currently on the time base between the registration and T1.

Note that, the reception-marker designated by ○ of FIG. 3C was the reception-marker designated by ● in FIG. 3B shows that idling was already completed successfully at the time of indication of the reception-marker designated by ○.

Up to now, the deciding unit 6 does not carry out any deciding operation on the result itself of the transition test of the connection state of the mobile communication terminal 1.

Then, as shown in FIG. 3C, because the strength of the signal which corresponds to the cell 21 and which is from the transmitter/receiver 3a is stronger than the strength of transmission of the transmitter/receiver 3b (and other transmitter/receivers), on the indication screen of the indicating unit 7, the schedule-marker of the solid line up to that time is varied to the schedule-marker of the dotted line (during transmission) and the schedule-marker is indicated by the schedule-marker generating unit 8b.

In accordance therewith, the operator can understand that the mobile communication terminal 1 is in a state in which the signal corresponding to the cell 21 is received from the transmitter/receiver 3a, and the connection state is going to be switched from the cell 22 to the cell 21.

(5) The transmitting/receiving unit 3 outputs the result of detecting that the mobile communication terminal 1 carried out the transition of the connection state from the cell 22 to the cell 21, to the reception measurement unit 4.

Then, the reception measurement unit 4 measures a time in which the mobile communication terminal 1 transits the connection state from the cell 22 to the cell 21, and outputs the measured result to the deciding unit 6.

Further, when the deciding unit 6 having received the measured result decides that the mobile communication terminal 1 carried out the transition of the connection state from the cell 22 to the cell 21 within 15 seconds from T1 to T2 with reference to the time information from the time setting unit 5a, the deciding unit 6 instructs the reception-marker generating unit 8c to indicate the reception-marker designated by ● (not shown) on the indication screen of the indicating unit 7.

In addition, when the result from the reception measurement unit 4 arrives after 15 seconds, the deciding unit 6 instructs the reception-marker generating unit 8c to indicate the reception-marker designated by X (not shown) on the indication screen of the indicating unit 7.

Note that, when the reception-marker designated by X is indicated, the deciding unit 6 may be configured so as to be able to cancel the test, and to examine the cause in the mobile communication terminal 1.

(6) The statistical processing unit 9 counts the number of times of the tests for each time when the mobile communication terminal 1 between T1 and T2 in FIG. 3C transits the connection state from the cell 22 to the cell 21, i.e., for each time required for switching, and transmits the counted value to the graph generating unit 8e, and for example, as shown in FIG. 6A, graphically indicates the test results in a format of a bar graph on the indication screen of the indicating unit 7.

Further, for example, as shown in FIG. 6B, the statistical processing unit 9 may take at least one of the success rate and the failure rate, and may indicate it on the indicating unit 7.

These indications can be carried out at a stage of the test in progress, or after the tests are completed as well.

(7) The test operations as described above are carried out up to the time when predetermined times of the operations are completed.

Namely, the test operations from the idling start to the time when one test is completed are repeated 1000 times.

Naturally, even if the mobile communication terminal 1 fails in the transition of the connection state on the way of the test, the test may be continued.

EXAMPLE 2

In Example 2, not only the test of the transition of the connection state of the mobile communication terminal 1 according to Example 1, but also the test of the transition of the state of calling including exchanges of messages between the mobile communication terminal 1 and the system simulators 11, 12, 13, . . . is added.

Example 2 is an example as well in which, in addition to the test result of the transition among the cells, the test result of the transition of the operational state of the same cells is indicated.

Next, the flow of the concrete test operations of the test system for the mobile communication terminal according to Example 2 of the invention will be described with reference to FIGS. 1, 4 and 5.

Figure 4:
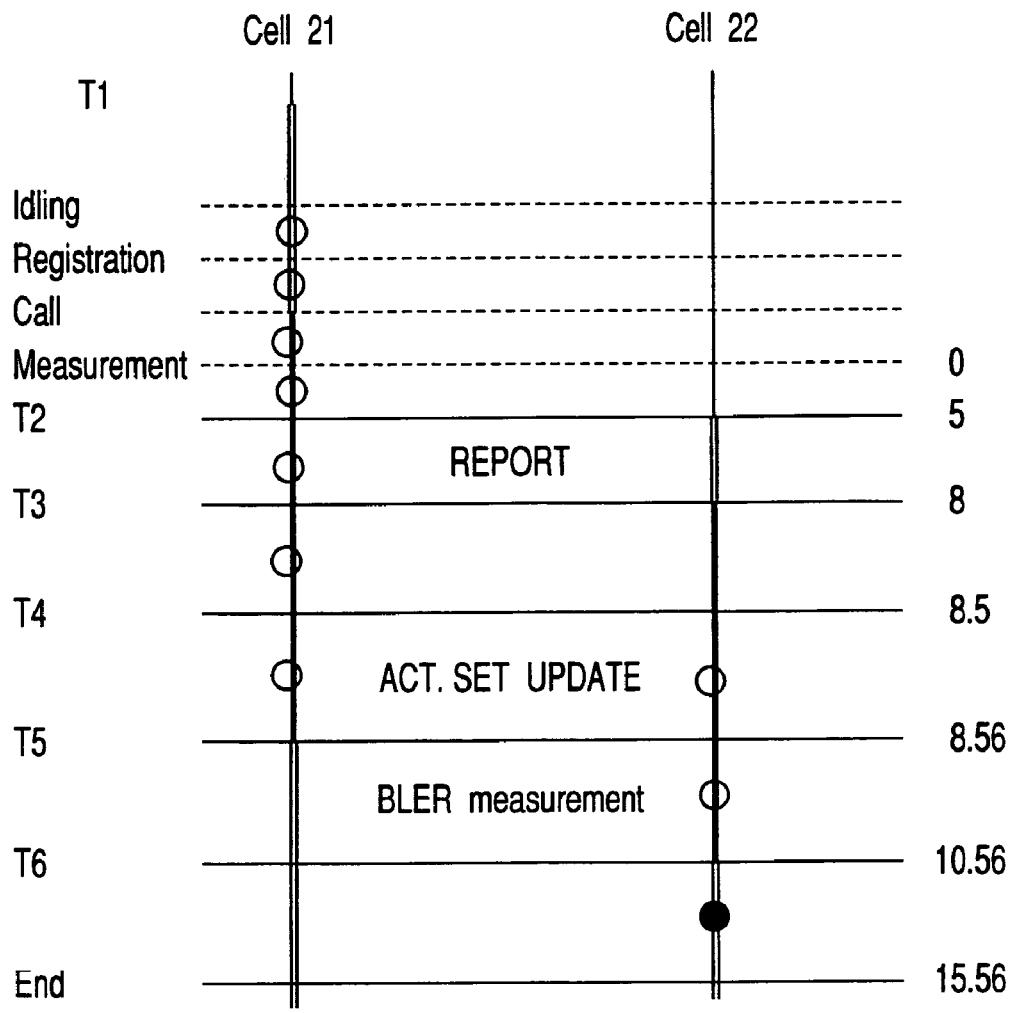
FIG. 4 is a diagram for explanation of an example of a transition of a connection state and a receiving state of the mobile communication terminal 1 to which the test system for the mobile communication terminal of FIG. 1 is applied.
Figure 5:
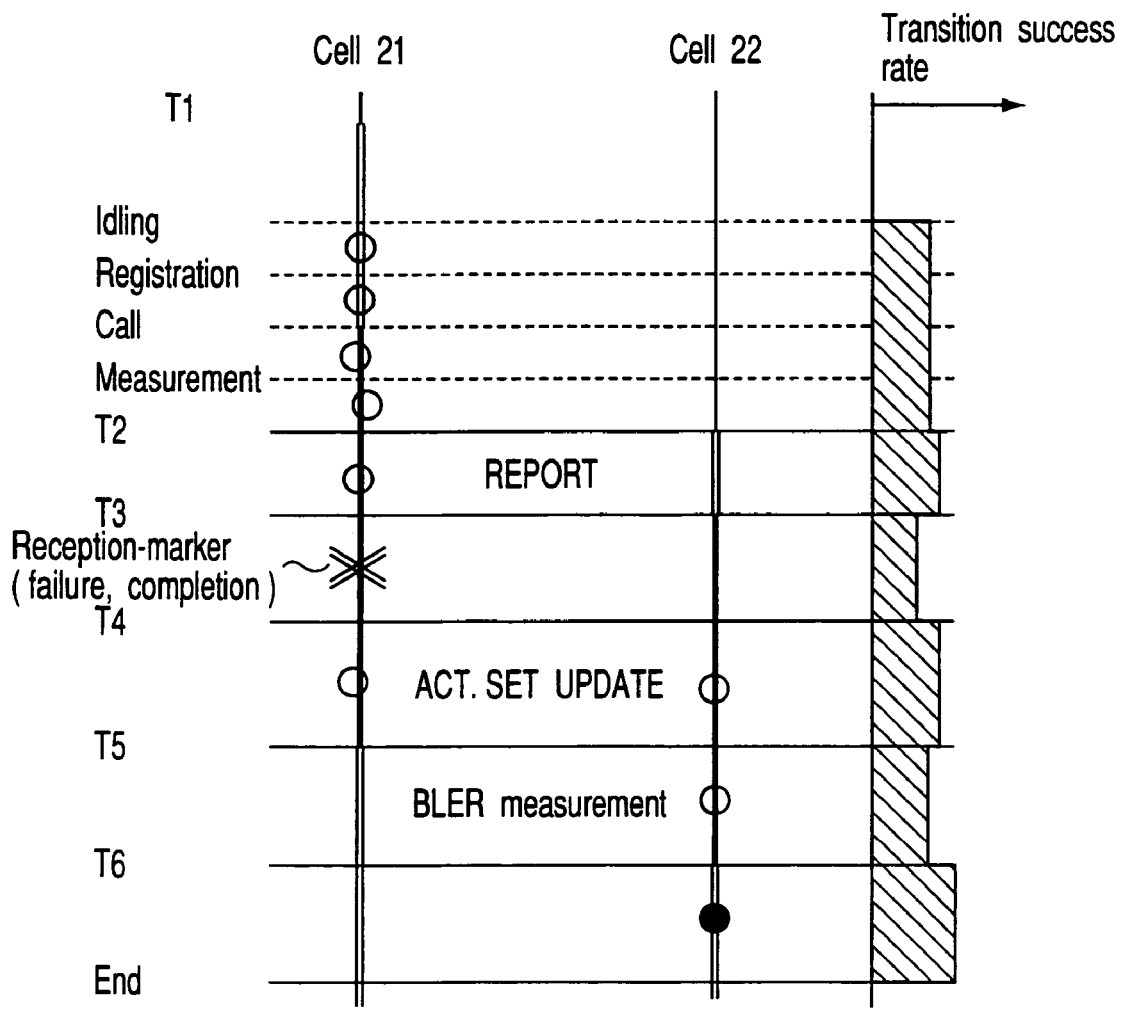
FIG. 5 is a diagram for explanation of another example of a transition of a connection state, among the cells, of the mobile communication terminal 1 to which the test system for the mobile communication terminal of FIG. 1 is applied.

FIGS. 4 and 5 are diagrams for explanation of examples of the transition tests of the connection state and the reception state of the mobile communication terminal 1 according to Example 2 of the invention to which the test system for the mobile communication terminal of FIG. 1 is applied.

First, as description of the outline of FIGS. 4 and 5, the abscissas indicated on the indication screen of the indicating unit 7 show the cell names, and the ordinates show the scheduled time-passage of the test.

In FIGS. 4 and 5, a state shown by the double line is a state in which only control information is transmitted from the system simulator, and the thick black line shows a state of carrying out calling (both of those are the schedules).

Further, the reception-marker designated by ● shows a success at the current point in time, the reception-marker designated by ○ shows a past success, the reception-marker designated by X shows a failure at the current point in time (not shown), and the X of the outlined double line shows a past failure (not shown).

Now, FIG. 4 shows the state when one test is completed.

(1) The test procedure control unit 5 carries out controls for the respective portions along the procedure which the unit 5 has. However, the time-passage is set by the time setting unit 5a.

(2) First, the coordinate generating unit 8d and the schedule-marker generating unit 8b indicate a state in which there are no reception-markers of FIG. 4 on the indication screen of the indicating unit 7 based on the information from the time setting unit 5a.

Further, the transmitter/receiver 3a starts to transmit the signal (signal corresponding to the cell 21) from T1 at a predetermined strength (level), and the transmitter/receiver 3b transmits the signal (signal corresponding to the cell 22) from T2 at a strength (level) which is the same as that of the transmitter/receiver 3a.

(3) The mobile communication terminal 1 receives the signal (signal corresponding to the cell 21) transmitted at the predetermined strength from the transmitter/receiver 3a, and starts idling. Thereafter, the mobile communication terminal 1 successively processes the respective items of registration of a position with the system simulator, "call" setting, and measurement, and transmits the processed results to the transmitting/receiving unit 3.

The transmitting/receiving unit 3 transmits the results of the successive processings by the mobile communication terminal 1 to the reception-marker generating unit 8c of the indication control unit 8 via the reception measurement unit 4.

Then, the reception-marker generating unit 8c generates the reception-marker designated by ●, and indicates the reception-marker designated by ● on the indication screen of the indicating unit 7 at the time when the mobile communication terminal 1 processed (in practice, because FIG. 4 shows the indicate the state at the time of completion, the marker is the reception-marker designated by ○ (hereinafter, in the same way in this case).

(4) At T2, the system simulator requests the message "REPORT" on whether or not the mobile communication terminal 1 has recognized the signal (signal corresponding to the cell 22) transmitted from the transmitter/receiver 3b, of the mobile communication terminal 1 via the transmitter/receiver 3a, and the transmitting/receiving unit 3 receives the REPORT in response thereto from the mobile communication terminal 1, and transmits the received result to the deciding unit 6.

The deciding unit 6 decides whether the mobile communication terminal 1 reported or not between T2 and T3 (for three seconds), and whether the content of the REPORT is "recognition" or not. When the decision is OK, the reception-marker designated by ● is indicated on the indication screen of the indicating unit 7 by the reception-marker generating unit 8c. If any of the both conditions is not satisfied, the reception-marker designated by X is indicated.

(5) The mobile communication terminal 1 switches to a state of capable of calling with both of the transmitter/receivers 3a and 3b between T3 and T4.

The deciding unit 6 receives the state of switching of the mobile communication terminal 1 from the transmitting/receiving unit 3, and decides whether or not the switching time is completed between T3 and T4 (within 0.5 seconds), and transmits the decided result to the reception-marker generating unit 8c.

In accordance therewith, the reception-marker generating unit 8c indicates the reception-marker designated by ● or the reception-marker designated by X on the indication screen of the indicating unit 7 in the same way as described above.

As one example thereof, FIG. 5 shows an example in which the reception-marker designated by the outlined X between T3 and T4.

(6) The test procedure control unit 5 causes the transmitter/receivers 3a and 3b to transmit a confirmatory message whether or not it is in a state of calling with the transmitter/receiver 3a and the transmitter/receiver 3b (a system simulator 11 and a system simulator 12) to the mobile communication terminal 1.

On the other hand, the deciding unit 6 having received the message "ACT. SET UPDATE" (Active Set Update) from the mobile communication terminal 1 via the transmitting/receiving unit 3 decides as a success provided that the response time is within T4 to T5 (0.06 seconds) and a message is "the state of calling", and nor, the deciding unit 6 decides as a failure.

This decided result by the deciding unit 6 is indicated on the indication screen of the indicating unit 7 by the reception-marker generating unit 8c.

(7) Between T5 and T6, the strength of the transmission signal of the transmitter/receiver 3a is made to deteriorate. As a result, the mobile communication terminal 1 switches the connection state from the state of receiving the signals of both of the transmitter/receiver 3a and the transmitter/receiver 3b to the state of receiving only the signal of the transmitter/receiver 3b, the transmitting/receiving unit 3 receives the signal from the mobile communication terminal 1, and an error rate of the message is measured by BLER measurement (Block Error Rate measurement) at the deciding unit 6.

The deciding unit 6 decides whether or not the time of switching and the error rate are less than or equal to a specified values (normal), indicates the reception-marker designated by ● or the reception-marker designated by X on the indication screen of the indicating unit 7 via the reception-marker generating unit 8b, and completes the test.

(8) In order to statistically determine the test results, for example, the test from T1 to the end as described above are repeated 1000 times.

Note that, in FIG. 5, as shown as the transition success rate at the right hand end on the indication screen of the indicating unit 7, a probability (or a frequency) of successes (or failures) for each time interval can be indicated.

This can be achieved by indicating, at the right hand end on the indication screen of the indicating unit 7, by the coordinate generating unit 8d, the transition success rate for each time interval which can be obtained due to the statistical processing unit 9 carrying out statistical processing by counting the decided result of the deciding unit 6, and there is the advantage that the operator can understand which process an error easily arises at, at a glance.

Note that, in FIG. 5, during the time when a message is being decided, the transition success rate at the right hand end on the indication screen of the indicating unit 7 is a rate including the decision on the contents.

Further, between T5 and T6, the result of, not the transition success rate, but measurement of the error rate may be indicated.

Note that, with respect to the success rate, a success rate at that time with respect to the all number of times of the tests is calculated, and for example, when the total number of times are 1000 times, provided that the success rate is achieved at the time of 900 times, it is decided as a success, and at that point in time, an instruction for canceling the test may be ordered.

Note that FIG. 5 shows the state of indication at the current point in time when 98 times of tests among 1000 times which is the scheduled number of times of the tests are completed.

As described above, according to the present invention, in transition tests by a system simulator of the mobile communication terminal 1 which are executed a predetermined times, there can be obtained the advantage that the results of the totalization of the number of times of the measured results of the respective transition times corresponding to the respective time zones in the plurality of time zones by the statistical processing unit, and the decided results of successes or failures of the transitions of the connection state by the deciding unit are received, and the indication control unit indicates the distribution of the number of times of the tests with respect to the transition times on the indicating unit, and distinctively indicate it to be able to distinguish the time zones of the successes and failures in the predetermined number of times of transition tests. Therefore, the operator can visually grasp the results of the test in progress and the movement and tendency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A test system for a mobile communication terminal, comprising:

a test procedure control unit which possesses a procedure for carrying out a transition test of a connection state of a mobile communication terminal of a cellular system for a predetermined number of times, and outputs control information including time setting information in accordance with the procedure;

a transmitting/receiving unit which, in accordance with the control information from the test procedure control unit, generates a plurality of test signals corresponding to a plurality of cells in the cellular system, varies said plurality of test signals so as to be successively stronger in accordance with a scheduled time-passage and transmits the signals toward the mobile communication terminal, and receives a response signal from the mobile communication terminal;

a reception measurement unit which measures a transition time that is a time when the mobile communication terminal switches from a state of receiving a first test signal showing the greatest strength at the current point in time among said plurality of test signals, to a state of receiving a second test signal becoming the greatest strength next time among said plurality of test signals accompanying that said plurality of test signals are varied so as to be successively stronger in accordance with the scheduled time-passage, according to the response signal from the mobile communication terminal;

a deciding unit which receives a measured result of the transition time from the reception measurement unit, and in accordance with the control information from the test procedure control unit, carries out a decision on success/failure whether a transition in which the mobile communication terminal switches from the state of receiving the first test signal among said plurality of test signals corresponding to said plurality of cells to the state of receiving the second test signal, is a success or a failure within a predetermined time;

a statistical processing unit which receives a measured result of respective transition times in the predetermined number of times of the transition tests from the reception measurement unit, classifies the measured results of the respective transition times into a plurality of time zones, and carries out a totalization of the number of times of the measured results of the respective transition times corresponding to the respective time zones in said plurality of time zones;

an indicating unit which indicates a result of the transition test of the connection state of the mobile communication terminal; and an indication control unit which receives a result of the totalization by the statistical processing unit and results of the respective decisions on successes/failures in the predetermined number of times of the transition tests from the deciding unit, and causes the indicating unit to indicate, as the result of the transition test of the connection state of the mobile communication terminal, a distribution of the number of times of the tests with respect to a transition time by graphical indication based on the totalized results of the number of times of the measured results of the respective transition times corresponding to the respective time zones in said plurality of time zones, and to distinctively indicate the distribution so as to be able to distinguish the time zones of the successes/failures in the predetermined number of times of the transition tests.

2. The test system for a mobile communication terminal according to claim 1, wherein the statistical processing unit receives the results of respective decisions on successes/failures in the predetermined number of times of the transition tests from the deciding unit, and carries out a calculation of at least one of the successes/failures at the respective times, and the indication control unit receives a result of at least one of the rates of successes/failures at the respective times from the statistical processing unit, and causes the indicating unit to plot and indicate at least one of the rates of successes/failures at the respective times as the result of the transition test of the connection state of the mobile communication terminal.

3. The test system for a mobile communication terminal according to claim 2, wherein the statistical processing unit carries out a calculation of a success rate={the number of times of successes from the (K-N)th test to the Kth test}/N (provided that N=a predetermined number of times), in the case where the Kth test is currently being carried out, and instructs the indication control unit to plot and indicate the success rate for each time on the indicating unit.

4. The test system for a mobile communication terminal according to claim 2, wherein the statistical processing unit carries out a calculation of a failure rate={the number of times of failures from the (K-N)th test to the Kth test}/N, provided that N=a predetermined number of times, in the case where the Kth test is currently being carried out, and instructs the indication control unit to plot and indicate the failure rate for each time on the indicating unit.

5. The test system for a mobile communication terminal according to claim 2, wherein the statistical processing unit estimates a tendency of a calculated value of the rate from the current number of times to the scheduled number of times based on a calculated value of at least one of the rates of the successes/failures at the respective times in the past, at a stage on the way of the predetermined number of times of the transition tests, and instructs the indication control unit to plot and indicate an estimated value for each time as an estimated line on the indicating unit.

6. The test system for a mobile communication terminal according to claim 1, wherein the test procedure control unit has a computer and computer readable program code means for causing the computer to carry out a transition test of a connection state of a mobile communication terminal of a cellular system for a predetermined number of times, and outputs control information including time setting information in accordance with the computer readable program code means.

7. The test system for a mobile communication terminal according to claim 6, wherein the deciding unit, the statistical processing unit, and the indication control unit are constructed as software of the computer together with the test procedure control unit.

8. The test system for a mobile communication terminal according to claim 7, wherein the computer readable program code means comprises:

first computer readable program code means for causing the transmitting/receiving unit to generate a plurality of test signals corresponding to a plurality of cells in the cellular system in accordance with the control information from the test procedure control unit, to vary said plurality of test signals so as to be successively stronger in accordance with a scheduled time-passage and transmit the signals toward the mobile communication terminal, and to receive a response signal from the mobile communication terminal;

second computer readable program code means for causing the reception measurement unit to measure a transition time that is a time when the mobile communication terminal switches from a state of receiving a first test signal showing the greatest strength at the current point in time among said plurality of test signals, to a state of receiving a second test signal becoming the greatest strength next time among said plurality of test signals accompanying that said plurality of test signals are varied so as to be successively stronger in accordance with the scheduled time-passage, according to the response signal from the mobile communication terminal;

third computer readable program code means for causing the deciding unit to receive a measured result of the transition time from the reception measurement unit, and to carry out a decision on success/failure whether a transition in which the mobile communication terminal switches from the state of receiving the first test signal among said plurality of test signals corresponding to said plurality of cells to the state of receiving the second test signal is a success or a failure within a predetermined time, in accordance with the control information from the test procedure control unit; and fourth computer readable program code means for causing the statistical processing unit to receive measured results of the respective transition times in the predetermined number of times of the transition tests from the reception measurement unit, to classify the measured results of the respective transition times into a plurality of time zones, and to carry out a totalization of the number of times of the measured results of the respective transition times corresponding to the respective time zones in said plurality of time zones; and fifth computer readable program code means for causing the indication control unit to receive a result of the totalization by the statistical processing unit and results of the respective decisions on successes/failures of the predetermined number of times of the transition tests from the deciding unit, and for causing the indicating unit to indicate, as the result of the transition test of the connection state of the mobile communication terminal, a distribution of the number of times of the tests with respect to the transition time by the graphical indication based on the totalized results of the number of times of the measured results of the respective transition times corresponding to the respective time zones in said plurality of time zones, and to distinctively indicate the distribution to be able to distinguish the time zones of the successes/failures in the predetermined number of times of the transition tests.

9. The test system for a mobile communication terminal according to claim 8, wherein the computer readable program code means further comprises:
- sixth computer readable program code means for causing the statistical processing unit to receive the results of the respective decisions on successes/failures in the predetermined number of times of the transition tests from the deciding unit, and to carry out a calculation of at least one of the rates of successes/failures at the respective times; and
- seventh computer readable program code means for causing the indication control unit to receive the result of the calculation of at least one of the rates of successes and failures at the respective times from the statistical processing unit, and for causing the indicating unit to plot and indicate at least one of the rates of successes and failures at the respective times as the result of the transition test of the connection state of the mobile communication terminal.

10. The test system for a mobile communication terminal according to claim 9, wherein the sixth computer readable program code means causes the statistical processing unit to carry out a calculation of a success rate={the number of times of successes from the (K-N)th test to the Kth test}/N, (provided that N=a predetermined number of times) in the case where the Kth test is currently being carried out, and
- the seventh computer readable program code means instructs the indication control unit to plot the success rate obtained by the calculation for each time and indicate it on the indicating unit.

11. The test system for a mobile communication terminal according to claim 9, wherein the sixth computer readable program code means causes the statistical processing unit to carry out a calculation of a failure rate={the number of times of failures from the (K-N)th test to the Kth test}/N, provided that N=a predetermined number of times, in the case where the Kth test is currently being carried out, and
- the seventh computer readable program code means instructs the indication control unit to plot the failure rate obtained by the calculation for each time and indicate it on the indicating unit.

12. The test system for a mobile communication terminal according to claim 9, wherein the sixth computer readable program code means causes the statistical processing unit to estimate a tendency of the calculated value of the rate from the current number of times to the scheduled number of times based on the calculated value of at least one of the rates of successes and failures at the respective times, at the stage on the way of the predetermined number of times of the transition tests, and
- the seventh computer readable program code means instructs the indication control unit to plot and indicate the estimated value for each time as the estimated line on the indicating unit, based on the estimation of the tendency of the calculated value of the rate from the current number of times to the scheduled number of times.

13. A method for testing a mobile communication terminal in the test system for a mobile communication terminal, the method comprising:
- preparing a test procedure control unit which possesses a procedure for carrying out a transition test of a connection state of a mobile communication terminal of a cellular system for a predetermined number of times, and outputs control information including time setting information in accordance with the procedure;
- in accordance with the control information from the test procedure control unit, generating a plurality of test signals corresponding to a plurality of cells in the cellular system, and varying said plurality of test signals so as to be successively stronger in accordance with a scheduled time-passage and transmitting the signals toward the mobile communication terminal;
- in accordance with a response signal from the mobile communication terminal, measuring a transition time that is a time when the mobile communication terminal switches from a state of receiving a first test signal showing the greatest strength at the current point in time among said plurality of test signals, to a state of receiving a second test signal becoming the greatest strength in the next point in time among said plurality of test signals accompanying that said plurality of test signals are varied so as to be successively stronger in accordance with the scheduled time-passage;
- receiving a measured result of the transition time, and in accordance with the control information from the test procedure control unit, carrying out a decision on success/failure whether a transition in which the mobile communication terminal switches from the state of receiving the first test signal among said plurality of test signals corresponding to said plurality of cells to the state of receiving the second test signal, is a success or a failure within a predetermined time;
- receiving measured results of respective transition times in the predetermined number of times of the transition tests, classifying the measured results of the respective transition times into a plurality of time zones, and carrying out a totalization of the number of times of the measured results of the respective transition times corresponding to respective time zones in said plurality of time zones; and
- receiving a result of the totalization and results of the respective decisions on successes/failures in the predetermined number of times of the transition tests, and causing an indicating unit to indicate, as the result of the transition test of the connection state of the mobile communication terminal, a distribution of the number of times of the tests with respect to a transition time by graphical indication based on the totalized results of the number of times of the measured results of the respective transition times corresponding to the respective time zones in said plurality of time zones, and to distinctively indicate the distribution so as to be able to distinguish the time zones of the successes/failures in the predetermined number of times of the transition tests.

14. A test system for a mobile communication terminal, comprising:
- test procedure control means for possessing a procedure for carrying out a transition test of a connection state of a mobile communication terminal of a cellular system for a predetermined number of times, and outputting control information including time setting information in accordance with the procedure;
- transmitting/receiving means for, in accordance with the control information from the test procedure control means, generating a plurality of test signals corresponding to a plurality of cells in the cellular system, varying said plurality of test signals so as to be successively stronger in accordance with a scheduled time-passage and transmitting the signals toward the mobile communication terminal, and receiving a response signal from the mobile communication terminal;

reception measurement means for, in accordance with the response signal from the mobile communication terminal, measuring a transition time that is a time when the mobile communication terminal switches from a state of receiving a first test signal showing the greatest strength at the current point in time among said plurality of test signals, to a state of receiving a second test signal becoming the greatest strength next time among said plurality of test signals accompanying that said plurality of test signals are varied so as to be successively stronger in accordance with the scheduled time-passage;

deciding means for receiving a measured result of the transition time from the reception measurement means, and in accordance with the control information from the test procedure control means, carrying out a decision on success/failure whether a transition in which the mobile communication terminal switches from the state of receiving the first test signal among said plurality of test signals corresponding to said plurality of cells to the state of receiving the second test signal, is a success or a failure within a predetermined time;

statistical processing means for receiving a measured result of the respective transition times in the predetermined number of times of the transition tests from the reception measurement means, classifying the measured results of the respective transition times into a plurality of time zones, and carrying out a totalization of the number of times of the measured results of the respective transition times corresponding to the respective time zones in said plurality of time zones;

indicating means for indicating a result of the transition test of the connection state of the mobile communication terminal; and indication control means for receiving a result of the totalization by the statistical processing means and results of the respective decisions on successes/failures in the predetermined number of times of the transition tests from the deciding means, and causing the indicating means to indicate, as the result of the transition test of the connection state of the mobile communication terminal, a distribution of the number of times of the tests with respect to a transition time by graphical indication based on the totalized results of the number of times of the measured results of the respective transition times corresponding to the respective time zones in said plurality of time zones, and to distinctively indicate the distribution so as to be able to distinguish the time zones of the successes/failures in the predetermined number of times of the transition tests.

15. The test system for a mobile communication terminal according to claim 14, wherein the statistical processing means receives the results of respective decisions on successes/failures in the predetermined number of times of the transition tests from the deciding means, and carries out a calculation of at least one of the successes/failures at the respective times, and
the indication control means receives a result of at least one of the rates of successes/failures at the respective times from the statistical processing means, and causes the indicating means to plot and indicate at least one of the rates of successes/failures at the respective times as the result of the transition test of the connection state of the mobile communication terminal.

16. The test system for a mobile communication terminal according to claim 15, wherein the statistical processing means estimates a tendency of a calculated value of the rate from the current number of times to the scheduled number of times based on a calculated value of at least one of the rates of the successes/failures at the respective times in the past, at a stage on the way of the predetermined number of times of the transition tests, and instructs the indication control means to plot and indicate an estimated value for each time as an estimated line on the indicating means.

17. The test system for a mobile communication terminal according to claim 14, wherein the test procedure control means has a computer and computer readable program code means for causing the computer to carry out a transition test of a connection state of a mobile communication terminal of a cellular system for a predetermined number of times, and outputs control information including time setting information in accordance with the computer readable program code means.

18. The test system for a mobile communication terminal according to claim 17, wherein the deciding means, the statistical processing means, and the indication control means are constructed as software of the computer together with the test procedure control means.

19. The test system for a mobile communication terminal according to claim 18, wherein the computer readable program code means comprises:

first computer readable program code means for causing the transmitting/receiving means to generate a plurality of test signals corresponding to a plurality of cells in the cellular system in accordance with the control information from the test procedure control means, to vary said plurality of test signals so as to be successively stronger in accordance with a scheduled time-passage and transmit the signals toward the mobile communication terminal, and to receive a response signal from the mobile communication terminal;

second computer readable program code means for causing the reception measurement means to measure a transition time that is a time when the mobile communication terminal switches from a state of receiving a first test signal showing the greatest strength at the current point in time among said plurality of test signals, to a state of receiving a second test signal becoming the greatest strength next time among said plurality of test signals accompanying that said plurality of test signals are varied so as to be successively stronger in accordance with the scheduled time-passage, according to the response signal from the mobile communication terminal;

third computer readable program code means for causing the deciding means to receive a measured result of the transition time from the reception measurement means, and to carry out a decision on success/failure whether a transition in which the mobile communication terminal switches from the state of receiving the first test signal among said plurality of test signals corresponding to said plurality of cells to the state of receiving the second test signal is a success or a failure within a predetermined time, in accordance with the control information from the test procedure control means; and fourth computer readable program code means for causing the statistical processing means to receive measured results of the respective transition times in the predetermined number of times of the transition tests from the reception measurement means, to classify the measured results of the respective transition times into a plurality of time zones, and to carry out a totalization of the number of times of the measured results of the respective transition times corresponding to the respective time zones in said plurality of time zones; and fifth computer readable program code means for causing the indication control means to receive a result of the totalization by the statistical processing means and results of the respective decisions on successes/failures of the predetermined number of times of the transition tests from the deciding means, and for causing the indicating means to indicate, as the result of the transition test of the connection state of the mobile communication terminal, a distribution of the number of times of the tests with respect to the transition time by the graphical indication based on the totalized results of the number of times of the measured results of the respective transition times corresponding to the respective time zones in said plurality of time zones, and to distinctively indicate the distribution to be able to distinguish the time zones of the successes/failures in the predetermined number of times of the transition tests.

20. The test system for a mobile communication terminal according to claim 19, wherein the computer readable program code means further comprises:

sixth computer readable program code means for causing the statistical processing means to receive the results of the respective decisions on successes/failures in the predetermined number of times of the transition tests from the deciding means, and to carry out a calculation of at least one of the rates of successes/failures at the respective times; and seventh computer readable program code means for causing the indication control means to receive the result of a calculation of at least one of the rates of successes and failures at the respective times from the statistical processing means, and for causing the indicating means to plot and indicate at least one of the rates of successes and failures at the respective times as the result of the transition test of the connection state of the mobile communication terminal.

21. The test system for a mobile communication terminal according to claim 20, wherein the sixth computer readable program code means causes the statistical processing means to estimate a tendency of the calculated value of the rate from the current number of times to the scheduled number of times based on the calculated value of at least one of the rates of successes and failures at the respective times, at the stage on the way of the predetermined number of times of the transition tests, and the seventh computer readable program code means instructs the indication control means to plot and indicate the estimated value for each time as the estimated line on the indicating means, based on the estimation of the tendency of the calculated value of the rate from the current number of times to the scheduled number of times.

* * * * *